(12) United States Patent
Fan et al.

(10) Patent No.: US 11,936,596 B2
(45) Date of Patent: Mar. 19, 2024

(54) BANDWIDTH PART PROCESSING METHOD AND APPARATUS

(71) Applicant: Huawei Technologies Co., Ltd., Shenzhen (CN)

(72) Inventors: Qiang Fan, Shenzhen (CN); Xing Liu, Shenzhen (CN); Chunhua You, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 441 days.

(21) Appl. No.: 17/171,677

(22) Filed: Feb. 9, 2021

(65) Prior Publication Data
US 2021/0167934 A1    Jun. 3, 2021

Related U.S. Application Data

(63) Continuation of application No. PCT/CN2019/099310, filed on Aug. 5, 2019.

(30) Foreign Application Priority Data

Aug. 9, 2018  (CN) .......................... 201810904442.7

(51) Int. Cl.
*H04L 5/00*     (2006.01)
*H04L 69/28*    (2022.01)
(Continued)

(52) U.S. Cl.
CPC ............ *H04L 5/0098* (2013.01); *H04L 69/28* (2013.01); *H04W 52/0212* (2013.01); *H04W 72/0453* (2013.01)

(58) Field of Classification Search
CPC .. H04L 5/0098; H04L 69/28; H04W 52/0212; H04W 72/0453
(Continued)

(56) References Cited

U.S. PATENT DOCUMENTS

2018/0270698 A1*  9/2018  Babaei ................. H04W 72/21
2018/0279229 A1*  9/2018  Dinan ............... H04W 74/0833
(Continued)

FOREIGN PATENT DOCUMENTS

| CN | 104054385 A | 9/2014 |
|---|---|---|
| CN | 109803354 A | 5/2019 |

(Continued)

OTHER PUBLICATIONS

NTT DOCOMO, Inc., "Remaing issues on bandwidth parts for NR", 3GPP TSG RAN WG1 Meeting #90, Prague, Czech Republic, R1-1713964, 5 pages, 3rd Generation Partnership Project, Valbonne, France (Aug. 21-25, 2017).

(Continued)

*Primary Examiner* — Mark G. Pannell
(74) *Attorney, Agent, or Firm* — Leydig, Voit & Mayer, Ltd.

(57) ABSTRACT

A bandwidth part processing method and apparatus is provided. The method includes: responsive to expiration of an inactivity timer corresponding to an active first bandwidth part BWP, determining whether a carrier in which the first BWP is located includes a second BWP in an active state; and responsive to determining that the carrier includes the second BWP in the active state, deactivating the first BWP. According to this method, an unnecessary BWP switch procedure can be avoided.

18 Claims, 8 Drawing Sheets

(51) Int. Cl.
*H04W 52/02* (2009.01)
*H04W 72/0453* (2023.01)

(58) Field of Classification Search
USPC .......................................................... 370/311
See application file for complete search history.

(56) References Cited

U.S. PATENT DOCUMENTS

| | | | | |
|---|---|---|---|---|
| 2019/0103954 A1* | 4/2019 | Lee | ........................ | H04L 5/0098 |
| 2019/0268965 A1* | 8/2019 | Jang | ........................ | H04W 72/12 |
| 2019/0313410 A1* | 10/2019 | Yang | ................. | H04W 72/0453 |
| 2019/0327769 A1* | 10/2019 | Yang | ........................ | H04B 7/088 |
| 2020/0059345 A1* | 2/2020 | Pelletier | ................. | H04L 5/0087 |
| 2020/0229089 A1* | 7/2020 | Tang | ........................ | H04L 5/001 |
| 2020/0274679 A1* | 8/2020 | Futaki | ................... | H04W 76/18 |
| 2020/0337051 A1* | 10/2020 | Chang | ............... | H04W 74/0833 |
| 2020/0351638 A1* | 11/2020 | Kim | ......................... | H04W 8/24 |
| 2020/0374914 A1* | 11/2020 | Kim | ..................... | H04L 5/0096 |
| 2020/0374942 A1* | 11/2020 | Sivavakeesar | .... | H04W 74/0833 |
| 2020/0403763 A1* | 12/2020 | Takeda | ................. | H04L 5/0098 |
| 2020/0412512 A1* | 12/2020 | Wu | ................... | H04W 72/0453 |
| 2021/0007139 A1* | 1/2021 | Fu | ........................ | H04L 41/0896 |
| 2021/0014862 A1* | 1/2021 | Yue | ........................... | H04L 5/00 |
| 2021/0045184 A1* | 2/2021 | Sato | ................... | H04W 72/1268 |
| 2021/0058218 A1* | 2/2021 | Harada | ................ | H04L 5/0098 |
| 2021/0112457 A1* | 4/2021 | Zhang | ................... | H04W 28/20 |
| 2021/0227623 A1* | 7/2021 | Park | ....................... | H04W 52/02 |
| 2021/0243807 A1* | 8/2021 | Hooli | ...................... | H04L 47/76 |
| 2021/0251017 A1* | 8/2021 | Chen | ................. | H04W 74/0841 |
| 2021/0281369 A1* | 9/2021 | Awad | .................... | H04L 5/0037 |
| 2021/0298038 A1* | 9/2021 | Kang | ..................... | H04L 5/0057 |
| 2021/0298052 A1* | 9/2021 | Namba | ................. | H04L 1/1851 |
| 2021/0320833 A1* | 10/2021 | Kim | ....................... | H04W 48/10 |
| 2021/0337585 A1* | 10/2021 | Liu | ........................ | H04L 5/001 |

FOREIGN PATENT DOCUMENTS

| | | |
|---|---|---|
| EP | 3506713 A1 | 7/2019 |
| EP | 3720167 A1 | 10/2020 |
| WO | 2018036560 A1 | 3/2018 |
| WO | 2018063944 A1 | 4/2018 |

OTHER PUBLICATIONS

Interdigital, Inc.,"Remaining details of BWP", 3GPP TSG RAN WG1 Meeting #90, Prague, Czech Republic, R1-1714117, total 4 pages, 3rd Generation Partnership Project, Valbonne, France (Aug. 21-25, 2017).

Huawei et al., "Summary of remaining issues on bandwidth part and wideband operation", 3GPP TSG RAN WG1 Meeting #92, Athens, Greece, R1-1801347, total 13 pages, 3rd Generation Partnership Project, Valbonne, France (Feb. 26-Mar. 2, 2018).

Interdigital, Inc., "Remaining details of BWP", 3GPP TSG RAN WG1 Meeting AH_NR#3, Prague, CZ, R1-1718365, 6 bages, 3rd Generation Partnership Project, Valbonne, France (Oct. 9-13, 2017).

Huawei et al., "Discussion on initial active BWP ID [H031]", 3GPP TSG-RAN WG2 Meeting #AH-1801, Vancouver, Canada, R2-1801484, 2 pages, 3rd Generation Partnership Project, Valbonne, France (Jan. 22-26, 2018).

* cited by examiner

BANDWIDTH PART PROCESSING METHOD AND APPARATUS

CROSS-REFERENCE TO RELATED APPLICATIONS

This application is a continuation of International Application No. PCT/CN2019/099310, filed on Aug. 5, 2019, which claims priority to Chinese Patent Application No. 201810904442.7, filed on Aug. 9, 2018. The disclosures of the aforementioned applications are hereby incorporated herein by reference in its entirety.

TECHNICAL FIELD

This application relates to the field of communications technologies, and in particular, to a bandwidth part (BWP) processing method and apparatus.

BACKGROUND

In a 5th generation (5G) mobile telecommunications new radio (NR) system, a system bandwidth or a carrier bandwidth may reach 400 megahertz (MHz). However, a bandwidth capability supported by a terminal is usually less than the system bandwidth or the carrier bandwidth. The bandwidth capability of the terminal may be a maximum bandwidth that can be supported by the terminal. For example, the bandwidth capability supported by the terminal may be 20 MHz, 50 MHz, or 100 MHz.

To adapt to the bandwidth capability of the terminal, a plurality of BWPs may be configured in one carrier, and each BWP may include a part of resources in frequency domain, for example, a segment of contiguous resources. For example, one BWP includes a group of contiguous resource blocks (RB) in a carrier. A network device (e.g., a base station) may allocate, to the terminal, a BWP that can be supported by the terminal. The network device may activate a BWP configured for the terminal, and then transmit a signal to the terminal on the active BWP. Currently, the network device activates only one BWP in one carrier for the terminal, so that the network device and the terminal transmit a signal on the active BWP.

With a higher 5G system bandwidth, the NR system can support more service types. Signals of different types of services may need to be transmitted by using different BWPs in a carrier. If one carrier supports only one active BWP simultaneously, it is difficult to meet a signal transmission requirement. Therefore, a plurality of BWPs in one carrier may be activated to transmit signals of a plurality of different types of services in a timely manner. However, when a plurality of BWPs in one carrier are in an active state simultaneously, if an existing processing method is still used for BWP activation and deactivation, an unnecessary operation may be performed, increasing power consumption of a device.

SUMMARY

Embodiments of this application provide a bandwidth part processing method and apparatus, to reduce power consumption of a device in a communication process.

According to a first aspect, an embodiment of this application provides a bandwidth part processing method. The method may be performed by a terminal or a communications apparatus (e.g., a chip system) that can support the terminal in implementing the method. In this application, an example in which the terminal performs the method is used for description. The method includes: when an inactivity timer corresponding to an active first BWP expires, determining whether a carrier in which the first BWP is located includes a second BWP in an active state; and when the carrier includes the second BWP in the active state, deactivating the first BWP.

According to a second aspect, this application provides a bandwidth part processing apparatus, including units or means configured to perform the steps according to the first aspect.

According to a third aspect, this application provides a bandwidth part processing apparatus, including at least one processor that is connected to a memory, where the at least one processor is configured to invoke a program stored in the memory to perform the method according to the first aspect. The memory may be a memory inside the apparatus, or may be a memory outside the apparatus.

According to a fourth aspect, this application provides a bandwidth part processing apparatus, including at least one processor and an interface circuit, where the at least one processor is configured to perform the method according to the first aspect.

According to a fifth aspect, this application provides a bandwidth part processing program, where when the program is executed by a processor, the program is configured to perform the method according to the first aspect.

According to a sixth aspect, a program product such as a computer-readable storage medium is provided, including the program according to the fifth aspect.

It can be learned that in the foregoing aspects, after a terminal determines an inactivity timer corresponding to an active first BWP expires, if the terminal determines that a carrier in which the first BWP is located further includes a second BWP in an active state, the terminal deactivates the first BWP. However, in the conventional technology, after the inactivity timer corresponding to the active first BWP expires, a BWP switch procedure needs to be performed, and specifically, the first BWP is deactivated, and a default BWP or an initial BWP in a carrier is activated. Unlike the conventional technology, according to the method in this application, only the first BWP is deactivated and an unnecessary BWP switch procedure can be avoided. Further, because the default BWP or the initial BWP is no longer activated in this method, the terminal does not need to monitor the default BWP or the initial BWP, and only needs to monitor a second BWP in a current carrier, thereby reducing overheads of monitoring the BWP by the terminal and reducing power consumption of the terminal in a communication process.

In the foregoing aspects, the second BWP may be a default BWP or an initial BWP, or may be a non-default BWP or a non-initial BWP. This is not limited in this application.

In a possible design, an example in which the second BWP is a non-default BWP or a non-initial BWP is used. In this design, when the carrier includes the second BWP in the active state, the terminal may further skip activating a default BWP or an initial BWP in the carrier. In this way, the terminal does not need to monitor the default BWP or the initial BWP, thereby reducing overheads of monitoring the BWP by the terminal and reducing power consumption of the terminal in a communication process.

In a possible design, when the carrier does not include the second BWP in the active state, the terminal activates a default BWP or an initial BWP in the carrier.

A quantity of default BWPs configured in the carrier is not limited in this application. In a possible design, there are at least two default BWPs in the carrier. In this design, that the terminal activates the default BWP in the carrier may include: activating all BWPs included in the at least two default BWPs; or activating a BWP that is included in the at least two default BWPs and that meets a preset rule.

In a possible design, the preset rule may include:
a BWP index is the largest;
a BWP index is the smallest;
a subcarrier spacing SCS is the largest;
an SCS is the smallest;
a cyclic prefix CP is the largest;
a CP is the smallest; or
a numerology is the same as a parameter of the first BWP.

In a possible design, the carrier includes at least two BWP groups, each BWP group includes at least one BWP, and a quantity of BWPs in the active state in each BWP group simultaneously is 1 or 0. In this possible design, the determining whether a carrier in which the first BWP is located includes a second BWP in an active state includes:

when a first BWP group does not include a default BWP, determining whether the second BWP in the active state is included in a second BWP group, where the first BWP group is a BWP group that is in the at least two BWP groups and that includes the first BWP, and the second BWP group is a BWP group that is in the at least two BWP groups and that does not include the first BWP; or when a first BWP group does not include a default BWP or an initial BWP, determining whether the second BWP in the active state is included in a second BWP group, where the first BWP group is a BWP group that is in the at least two BWP groups and that includes the first BWP, and the second BWP group is a BWP group that is in the at least two BWP groups and that does not include the first BWP.

In a possible design, the carrier includes at least two BWP groups, and each BWP group includes at least one BWP. In this possible design, the determining whether a carrier in which the first BWP is located includes a second BWP in an active state includes: determining whether the second BWP in the active state is included in a first BWP group, where the first BWP group is a BWP group that is in the at least two BWP groups and that includes the first BWP.

In a possible design, timing durations of inactivity timers corresponding to BWPs in a same BWP group are the same.

In a possible design, the timing duration of the inactivity timer may be a carrier-specific timing duration or a BWP-specific timing duration. The carrier-specific timing duration may be understood as that timing durations of inactivity timers maintained by any active non-default BWPs in a same carrier are the same. The BWP-specific timing duration may be understood as that the timing duration of the inactivity timer corresponds to a specific non-default BWP. When the timing duration of the inactivity timer is configured as the BWP-specific timing duration, timing durations of inactivity timers maintained by a plurality of non-default BWPs in one carrier may be different.

In a possible design, the timing duration of the inactivity timer may be related to a parameter of a BWP in the carrier. The parameter of the BWP may include an SCS and/or a CP.

In a possible design, the BWP group is preconfigured by using a predefined rule or configured by using signaling.

In a possible design, the predefined rule includes that BWPs in a same BWP group have a same parameter, or a same default BWP is configured for BWPs in a same BWP group.

DESCRIPTION OF EMBODIMENTS

The following describes this application in detail with reference to the accompanying drawings in the specification.

Some terms in this application are first described, to help a person skilled in the art have a better understanding.

(1) A terminal may be a device that provides voice and/or data connectivity for a user, and may also be referred to as user equipment (UE), a mobile station (MS), a mobile terminal (MT), or the like. For example, the terminal is a handheld device or a vehicle-mounted device that has a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

(2) A network device is a device in a wireless network, for example, a radio access network (RAN) node (or device) that connects a terminal to the wireless network, and may also be referred to as a base station. Currently, for example, the RAN node is a next generation NodeB (gNB), a transmission reception point (TRP), an evolved NodeB (eNB), a radio network controller (RNC), a NodeB (NB), a base station controller (BSC), a base transceiver station (BTS), a home evolved NodeB (e.g., a home evolved NodeB or a home NodeB, HNB), a baseband unit (BBU), or a wireless fidelity (Wi-Fi) access point (AP). In addition, in a network structure, a RAN may include a central unit (CU) node and a distributed unit (DU) node. In this structure, protocol layers of an eNB in a long term evolution (LTE) system are split, where functions of some protocol layers are centrally controlled by the CU, functions of some or all of remaining protocol layers are distributed in the DU, and the DU is centrally controlled by the CU.

(3) A system bandwidth is a bandwidth supported by one carrier in an NR system, and may also be referred to as a carrier bandwidth, a carrier, or the like. For example, the carrier bandwidth in the NR system may be one of 10 MHz, 15 MHz, 20 MHz, 50 MHz, 100 MHz, and 400 MHz.

(4) A carrier may be a radio wave used to modulate a to-be-sent signal, for example, a sine wave. A carrier signal is usually a sine signal used to modulate a to-be-transmitted signal, and corresponds to a carrier.

Figure 1A:
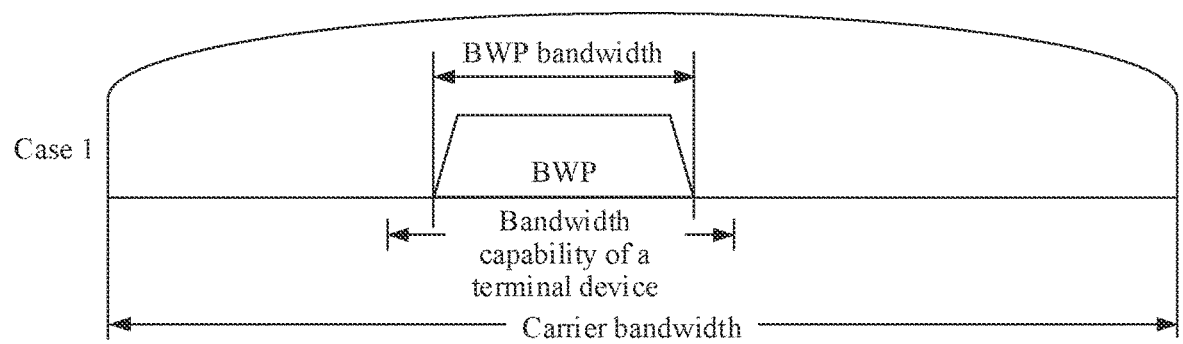
FIG. 1A to FIG. 1C are schematic diagrams of a BWP configuration in a carrier bandwidth according to an embodiment of this application.
Figure 1B:
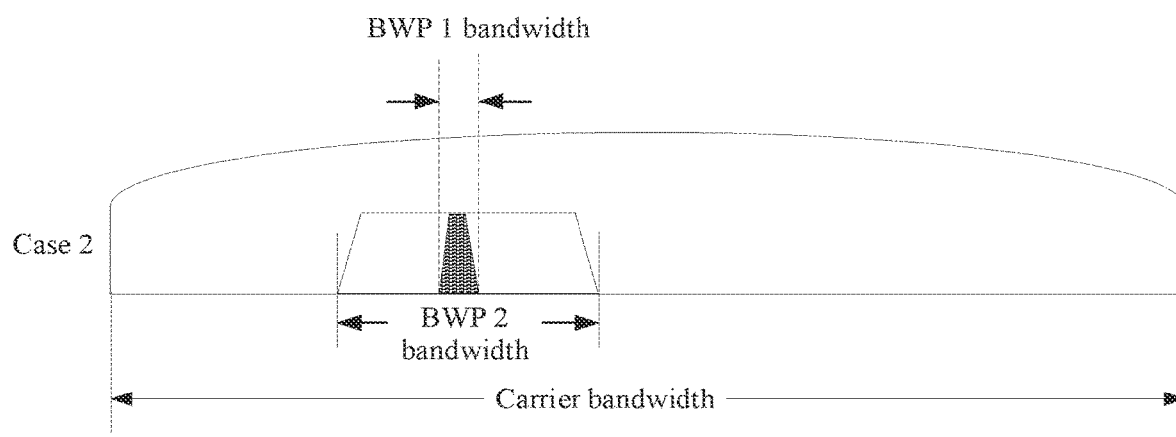
Figure 1C:
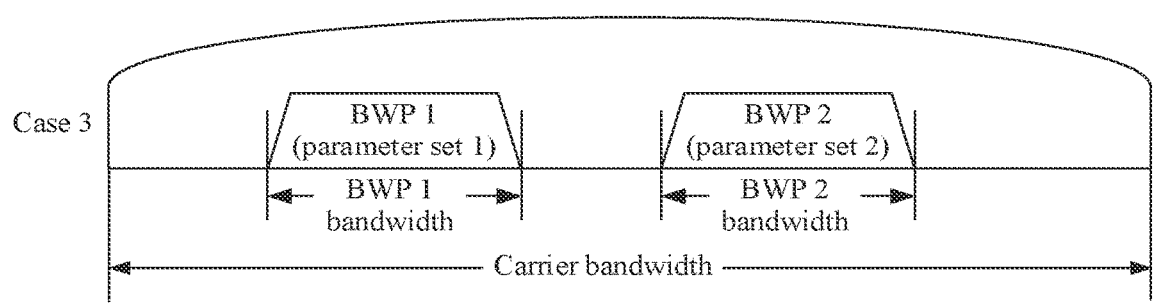

(5) A BWP is a resource configured for a terminal in a carrier bandwidth in the NR system to adapt to a bandwidth capability of the terminal, for example, a group of contiguous RBs is in the carrier bandwidth. A plurality of BWPs may be configured in one carrier, for example, four BWPs may be configured in one carrier. A BWP in an active state is a currently available BWP. In addition, the bandwidth part may also be sometimes referred to as a carrier bandwidth part, a subband bandwidth, a narrowbandbandwidth, or another name. The name is not limited in this application. For ease of description, an example in which the name is BWP is used for description. For example, one BWP includes K (K>0) subcarriers. Alternatively, one BWP is a frequency domain resource in which N non-overlapping RBs are located, and subcarrier spacings of the RBs may be 15 kHz, 30 kHz, 60 kHz, 120 kHz, 240 kHz, 480 kHz, or another value. Alternatively, one BWP is a frequency domain resource in which M non-overlapping resource block groups (RBG) are located. For example, one RBG includes P (P>0) contiguous RBs, and subcarrier spacings (SCS) of the RBs may be 15 kHz, 30 kHz, 60 kHz, 120 kHz, 240 kHz, 480 kHz, or another value, for example, an integer multiple of 2. FIG. 1A to FIG. 1C show three BWP configurations in a carrier bandwidth according to an embodiment of this application. FIG. 1A shows a case in which one BWP is configured in a carrier bandwidth. A network device may first allocate a BWP within a bandwidth capability range of a terminal to the terminal, and certainly, may further allocate some or all resources in the BWP to the terminal for data transmission. The network device may configure different BWPs for the terminal based on an actual scenario. For example, to reduce power consumption of the terminal, the network device may allocate a BWP to the terminal based on a traffic volume of the terminal. When the terminal does not transmit service data or transmits a small quantity of service data, a relatively small BWP, such as a BWP 1 shown in FIG. 1B, may be allocated to the terminal to receive control information and a small quantity of data information. When the terminal needs to transmit a large quantity of service data, a relatively large bandwidth part, such as a BWP 2 shown in FIG. 1B, may be allocated to the terminal. For another example, because 5G can support a plurality of service types and communication scenarios, different parameters may be configured for different service types and communication scenarios. The network device may allocate corresponding BWPs to the terminal based on different service types of the terminal. As shown in FIG. 1C, one BWP may correspond to one service type. A parameter set (numerology) that can meet a service requirement may be configured for the BWP to meet the service requirement of the service type. It can be learned from FIG. 1B that different BWPs may occupy partially overlapping frequency domain resources. It can be learned from FIG. 1C that different BWPs may alternatively occupy completely different frequency domain resources and use different numerologies. In this embodiment of this application, numerologies corresponding to different BWPs may be the same or may be different. This is not limited in this application. It may be understood that in FIG. 1A to FIG. 1C, only an example in which one BWP or two BWPs are configured in one carrier is used for description. In actual application, a plurality of BWPs may be configured in the carrier. This is not limited in this application.

For example, the BWP in this application may be a downlink BWP, and is used by the terminal for downlink receiving. In this case, a bandwidth of the BWP does not exceed a receive bandwidth capability of the terminal. Alternatively, the BWP may be an uplink BWP, and is used by the terminal for uplink sending. In this case, a bandwidth of the BWP does not exceed a transmit bandwidth capability of the terminal.

(6) A numerology is a parameter used in a communications system, for example, and may refer to a series of physical layer parameters in an air interface. One BWP may correspond to one numerology. The NR system can support a plurality of numerologies, and the plurality of numerologies may be used at the same time. The numerology may include one or more of the following parameter information: information about a subcarrier spacing, information about a cyclic prefix (CP), information about a time unit, information about a bandwidth, and the like. The information about the CP may include a length of the CP and/or a type of the CP. For example, the CP may be a normal CP (NCP) or an extended CP (ECP). The time unit is used to indicate a time unit in time domain, and may be, for example, a sampling point, a symbol, a mini-slot, a slot, a subframe, or a radio frame. The information about the time unit may include a type, a length, a structure, or the like of the time unit. For example, the numerology may include a subcarrier spacing and a CP. Table 1 shows a numerology that can be currently supported in the NR system and that is defined by the subcarrier spacing and the CP.

TABLE 1

| μ | Subcarrier spacing = $2^\mu \cdot 15$(kHz) | CP type |
|---|---|---|
| 0 | 15 | Normal |
| 1 | 30 | Normal |
| 2 | 60 | Normal or extended |
| 3 | 120 | Normal |
| 4 | 240 | Normal | the value μ is used to determine a subcarrier spacing. For example, when μ = 0, the subcarrier spacing is 15 kHz; or when μ = 1, the subcarrier spacing is 30 kHz.

Using a subcarrier spacing as an example, if the terminal supports subcarrier spacings of 15 kHz and 30 kHz, the network device may allocate a BWP with a subcarrier spacing of 15 kHz and a BWP with a subcarrier spacing of 30 kHz to the terminal. The terminal may perform switching between different BWPs based on different scenarios and service requirements, for signal transmission. When the terminal supports a plurality of BWPs, numerologies corresponding to different BWPs may be the same or may be different.

The subcarrier spacing may be an integer greater than or equal to 0. For example, the subcarrier spacing may be 15 kHz, 30 kHz, 60 kHz, 120 kHz, 240 kHz, or 480 kHz. The subcarrier spacing is a value of a spacing between center locations of two adjacent subcarriers in frequency domain, or a spacing between peak locations of the two adjacent subcarriers in the frequency domain in an orthogonal frequency division multiplexing (OFDM) system. For example, a subcarrier spacing in the LTE system is 15 kHz, and a subcarrier spacing in the NR system may be 15 kHz, 30 kHz, 60 kHz, or 120 kHz.

(7) An initial BWP is used for initial random access of the terminal, and may include an initial downlink BWP and an initial uplink BWP. It may be understood that in the initial random access process of the terminal, the terminal may transmit a signal to the network device or perform a related operation by using the initial BWP.

(8) A non-initial BWP is opposite to an initial BWP, and all BWPs included in a carrier except the initial BWP may be referred to as non-initial BWPs.

(9) A BWP switch is used to switch to a new active BWP. In a possible implementation, after the random access process of the terminal is completed, the network device (e.g., a base station) configures one or more BWPs for the terminal by using a radio resource control (RRC) message, and the network device may switch to a new active BWP by using the RRC message or downlink control information (DCI). In other words, the new BWP is activated, and an old BWP is deactivated. In a switch method, an index of a target BWP to be activated is carried in the RRC message or the DCI, so that the terminal performs a BWP switch. When the terminal performs the BWP switch, the terminal deactivates an originally working BWP and activates a target BWP to be switched to. In another possible implementation, when an inactivity timer corresponding to a currently active BWP expires, the terminal performs the BWP switch, that is, the terminal deactivates an originally working BWP and activates a target BWP to be switched to. For example, for a frequency division duplex (FDD) system, a BWP switch in a downlink communication process and a BWP switch in an uplink communication process may be performed independently, that is, only a downlink BWP/uplink BWP may be switched by using the RRC message or the DCI. For a time division duplex (TDD) system, a downlink BWP and an uplink BWP appear and are switched in pairs. For example, when a downlink BWP is switched, an uplink BWP corresponding to the downlink BWP is also switched at the same time.

(10) Default BWP: In the NR system, in addition to an initial BWP used for the initial random access, a plurality of BWPs may be configured in one carrier. For example, four BWPs may be configured in one carrier. For downlink communication, one of a plurality of downlink BWPs configured in a downlink carrier except an initial downlink BWP may be set as a default BWP. For example, a downlink BWP with a relatively low bandwidth among the plurality of downlink BWPs may be set as the default BWP. The default BWP in this application may also be referred to as a default downlink BWP. For unified description, the default downlink BWP is described as the default BWP in the following. The default BWP is introduced into the NR system, so that when the terminal and the network device have different understandings of a current active BWP, the network device can correctly find the terminal. For example, the network device may send, to the terminal, DCI indicating a BWP switch, so that the terminal switches a currently active BWP. If the DCI is lost, and consequently the terminal does not receive the DCI, the terminal does not switch to the currently active BWP. But the network device incorrectly considers that the terminal has performed the BWP switch, and then schedules the terminal on a mistakenly active BWP, but a response from the terminal cannot be received. After a period of time, the terminal may fall back to the default BWP, so that the network device can find the terminal on the default BWP again. On the other hand, when the terminal is not scheduled for a long time, the terminal may fall back to a default BWP with a relatively low bandwidth, to reduce power consumption of the terminal.

(11) A non-default BWP is opposite to a default BWP, and all BWPs included in a carrier except the default BWP may be referred to as non-default BWPs.

(12) Inactivity timer. A corresponding inactivity timer is maintained for an active non-default BWP in a carrier. When a non-default BWP in the carrier is activated, an inactivity timer corresponding to the non-default BWP is triggered. When the inactivity timer expires, a BWP switch is performed. It may be understood that the inactivity timer is used to control a time in which the BWP is in an active state. Specifically, if a default BWP is configured in the carrier, the terminal may switch from a currently active BWP to the default BWP by performing the BWP switch. Otherwise, if no default BWP is configured in the carrier, the terminal may switch from the currently active BWP to an initial BWP by performing the BWP switch. Switching from the currently active BWP to the default BWP means deactivating the currently active BWP and activating the default BWP. Similarly, switching from the currently active BWP to the initial BWP means deactivating the currently active BWP and activating the initial BWP.

(13) A timing duration of the inactivity timer refers to a duration from starting of the inactivity timer to timeout running, and may be determined by a total count value and a count granularity (or referred to as a unit of count).

(14) An active state may be a working state. That the BWP is in the active state means that the BWP is in the working state, for example, a state in which a signal can be sent or received. An inactive state is opposite to the active state, and may be a non-working state. That the BWP is in the inactive state means that the BWP is in the non-working state. For example, the BWP in the inactive state cannot be used to send or receive a signal.

(15) An active BWP is a BWP in an active state, or may be understood as a BWP that can be used to send and/or receive a signal. An inactive BWP is opposite to an active BWP, and is a BWP in an inactive state, or may be understood as a BWP that cannot be used to send and/or receive a signal.

(16) Deactivation may refer to performing deactivation on the BWP, may also be described as "deactivating" the BWP, that is, switching the BWP from an active state to an inactive state, which may also be understood as switching from a working BWP to a non-working BWP.

(17) In the descriptions of this application, unless otherwise stated, "a plurality of" means two or more, and other quantifiers are similar to this. "And/or" describes an association relationship between associated objects and represents that three relationships may exist. For example, A and/or B may represent the following three cases: Only A exists, both A and B exist, and only B exists. The character "/" usually indicates an "or" relationship between the associated objects.

(18) The nouns "network" and "system" are usually interchangeably used, but meanings of the nouns can be understood by a person skilled in the art.

It should be understood that, in descriptions of this application, words such as "first" and "second" are merely used for distinction and description, and shall not be understood as an indication or implication of relative importance or an indication or implication of an order.

Figure 2:
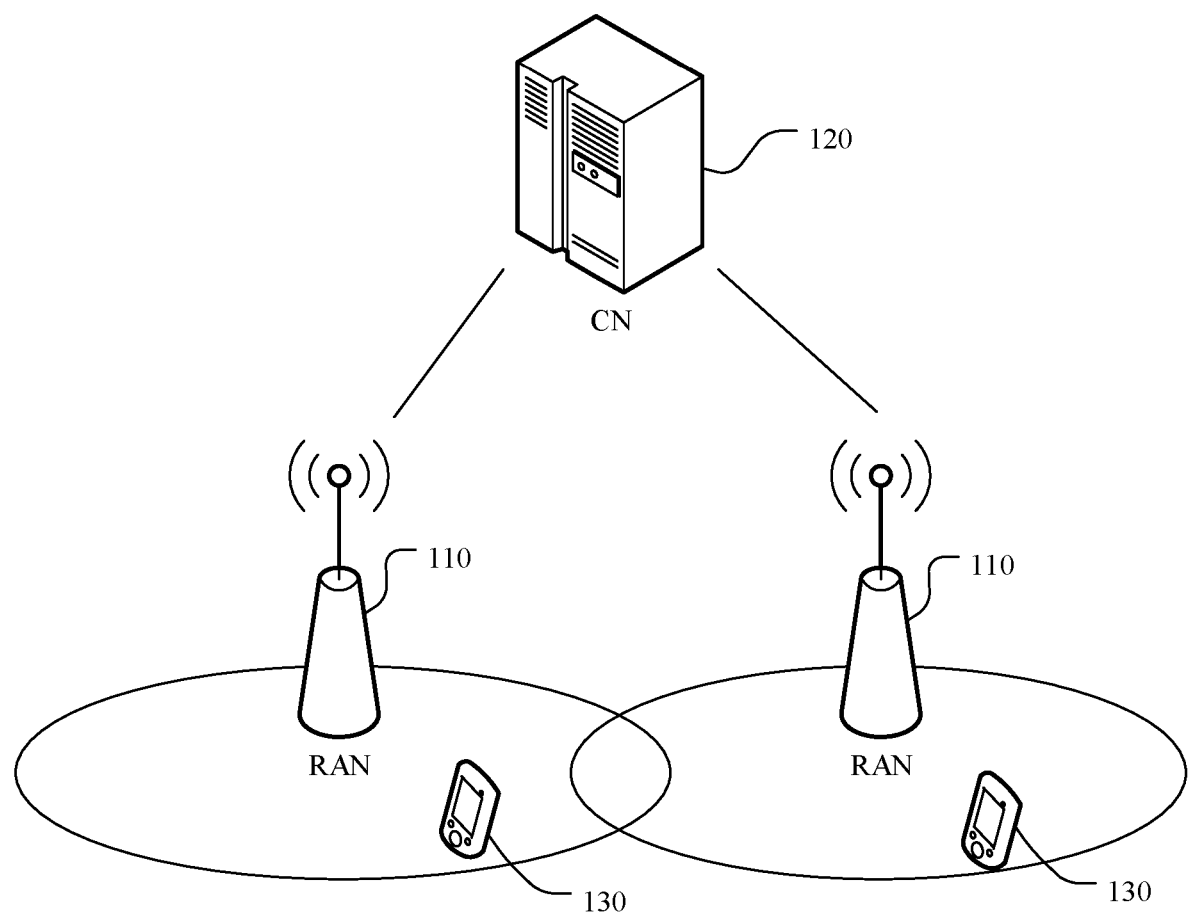
FIG. 2 is a schematic diagram of a communications system to which an embodiment of this application is applicable.

FIG. 2 is a schematic diagram of a communications system to which an embodiment of this application is applicable. As shown in FIG. 2, a terminal 130 accesses a wireless network, to obtain a service from an external network (e.g., the Internet) over the wireless network or communicate with another terminal over the wireless network. The wireless network includes a radio access network (RAN) 110 and a core network (CN) 120. The RAN 110 is configured to connect the terminal 130 to the wireless network, and the CN 120 is configured to manage the terminal and provide a gateway for communicating with the external network. It should be understood that a network architecture shown in FIG. 2 is described by using an example in which only two terminals are included. However, this embodiment of this application is not limited thereto. For example, the network architecture may further include more terminals. Similarly, the network architecture may also include more RANs 110, and may further include other devices.

Figure 3:
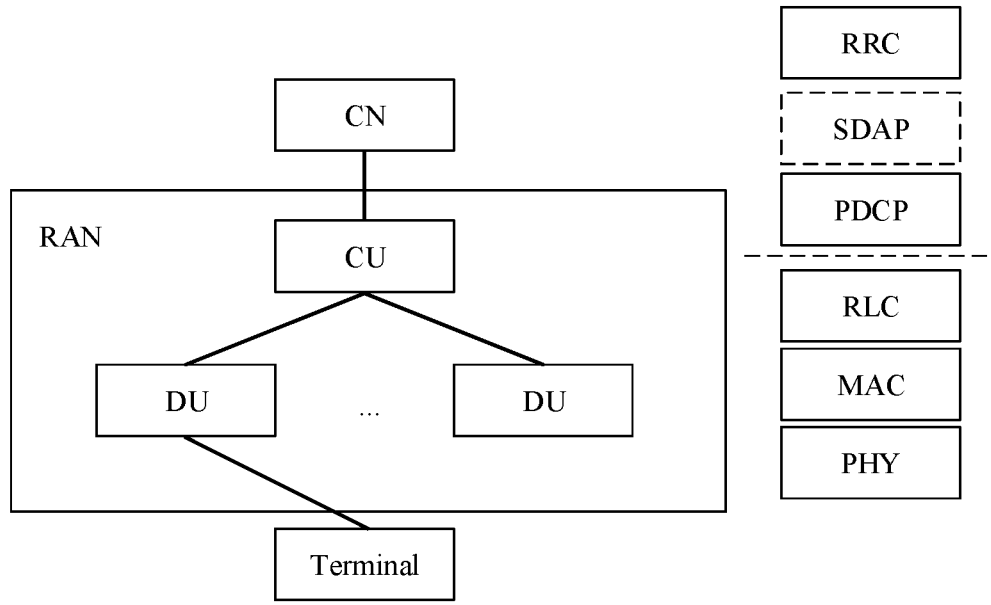
FIG. 3 is a schematic diagram of a network architecture according to an embodiment of this application.

FIG. 3 is a schematic diagram of a network architecture according to an embodiment of this application. As shown in FIG. 3, the network architecture includes a CN device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or some remote parts are integrated into the baseband apparatus. For example, in a long term evolution (LTE) communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In an implementation, a service data adaptation protocol (SDAP) layer is further included above the PDCP layer.

The RAN device may implement the functions of the protocol layers such as the RRC layer, the SDAP layer, the PDCP layer, the RLC layer, and the MAC layer by using one node, or may implement the functions of these protocol layers by using a plurality of nodes. For example, in an evolved structure, the RAN device may include a central unit (CU) and a distributed unit (DU), and a plurality of DUs may be centrally controlled by one CU. As shown in FIG. 3, the CU and the DU may be divided based on protocol layers of a wireless network. For example, functions of the PDCP layer and protocol layers above the PDCP layer are set on the CU, and functions of protocol layers below the PDCP layer, such as the RLC layer and the MAC layer, are set on the DU.

Division based on the protocol layers is merely an example, and division may alternatively be performed based on another protocol layer, for example, the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, the division is performed based on a latency. A function with a processing time needing to meet a latency requirement is set on the DU, and a function with a processing time not needing to meet the latency requirement is set on the CU.

In addition, the radio frequency apparatus may not be placed in the DU but is placed remotely from the DU, or may be integrated into the DU, or some remote parts of the radio frequency apparatus are integrated into the DU. This is not limited herein.

Figure 4:
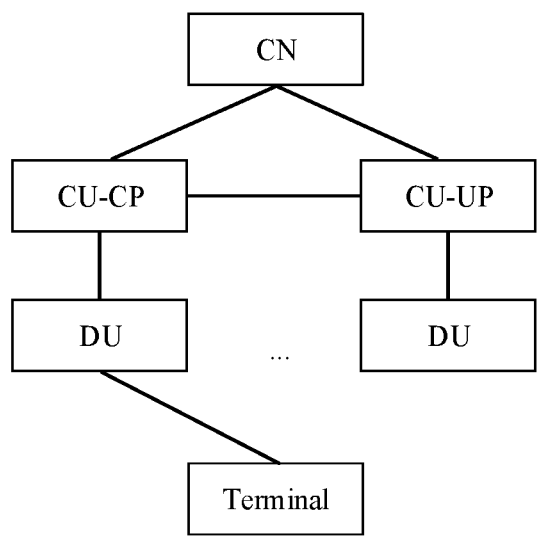
FIG. 4 is a schematic diagram of another network architecture according to an embodiment of this application.

Compared with the architecture shown in FIG. 3, further referring to FIG. 4, a control plane and a user plane of the CU may be separated and implemented by using different entities, which are respectively a control plane CU entity (CU-CP entity) and a user plane CU entity (CU-UP entity).

In the foregoing network architecture, signaling generated by the CU may be sent to a terminal by using the DU, or signaling generated by a terminal may be sent to the CU by using the DU. The DU may transparently transmit the signaling to the terminal or the CU by directly encapsulating the signaling at a protocol layer without parsing the signaling. In the following embodiments, if transmission of such signaling between the DU and the terminal is involved, that the DU sends or receives the signaling includes this scenario. For example, signaling at the RRC layer or the PDCP layer is finally processed as signaling at the PHY layer and sent to the terminal, or is converted from received signaling at the PHY layer. In this architecture, it may also be considered that the signaling at the RRC layer or the PDCP layer is sent by the DU, or sent by the DU and the radio frequency apparatus.

In the foregoing embodiments, the CU may be classified as a network device on a RAN side. In addition, the CU may alternatively be classified as a network device on a CN side. This is not limited herein.

An apparatus in the following embodiments of this application may be located in the terminal or the network device based on functions implemented by the apparatus. When the foregoing CU-DU structure is used, the network device may be a CU node, a DU node, or a RAN device including a CU node and a DU node.

In a wireless communications system, for example, a 5G system, more service types and/or communication scenarios can be supported. Therefore, a design that supports a plurality of numerologies is proposed. Numerologies may be independently set for different service types and/or communication scenarios. The network device may configure a plurality of BWPs in one carrier, and may independently configure a numerology for each of the plurality of BWPs, to support a plurality of service types and/or communication scenarios in a system frequency resource.

Currently, the network device may configure a plurality of BWPs for the terminal in one carrier. However, simultaneously, the network device activates only one BWP configured for the terminal in one carrier, so that the network device and the terminal perform signal transmission on the active BWP. For an uplink carrier, the network device configures and activates an uplink BWP. For a downlink carrier, the network device configures and activates a downlink BWP. In the embodiments of this application, an example in which the network device configures a downlink BWP for the terminal is used for description. However, signals of different service types and/or communication scenarios may need to be transmitted by using different BWPs in the carrier. If one carrier supports only one active BWP simultaneously, it is difficult to meet a signal transmission requirement. Therefore, a plurality of BWPs in one carrier may be activated to transmit signals of a plurality of different types of services in a timely manner. However, when a plurality of BWPs in one carrier are in an active state simultaneously, there is no corresponding solution to BWP processing in the conventional technology. If an existing processing method is still used, an unnecessary operation may be performed, increasing power consumption of a device. For example, it is assumed that the network device configures a BWP 1, a BWP 2, and a default BWP for the terminal, and the BWP 1 and the BWP 2 are currently in the active state. If an inactivity timer corresponding to the BWP 1 expires, according to the method in the conventional technology, the terminal performs a BWP switch, deactivates the BWP 1, and activates the default BWP, so that the terminal needs to monitor the BWP 2 and the default BWP (e.g., monitor a PDCCH). In this application, that the terminal monitors the BWP means that the terminal monitors data and/or a control channel on the BWP. If the method in the conventional technology is still used, an unnecessary operation may be performed, increasing power consumption of a device.

Based on the foregoing existing problem, an embodiment of this application provides a bandwidth part processing method. When an inactivity timer corresponding to an active first BWP expires, it is determined whether a carrier in which the first BWP is located includes a second BWP in an active state. When the carrier includes the second BWP in the active state, the first BWP is deactivated. According to this method, an unnecessary BWP switch procedure can be avoided. In addition, because the BWP switch procedure usually requires a specific period of time, a BWP processing time can be further reduced by using this method. Further, when the second BWP is a non-default BWP or an initial BWP, because the default BWP or the initial BWP is no longer activated subsequently in this method, the terminal does not need to monitor a PDCCH on the default BWP or the initial BWP, and only needs to monitor a second BWP in a current carrier, thereby reducing overheads of monitoring the BWP by the terminal and reducing power consumption of the terminal in a communication process.

Embodiment 1

Figure 5:
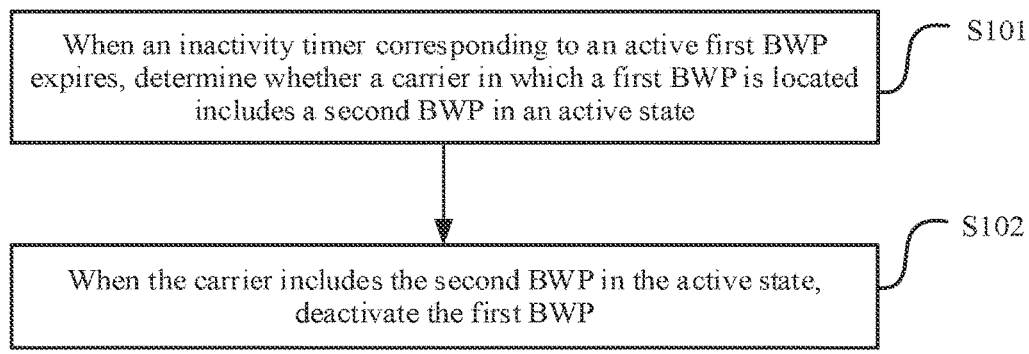
FIG. 5 is an implementation flowchart of a bandwidth part processing method according to an embodiment of this application.

FIG. 5 is an implementation flowchart of a bandwidth part processing method according to an embodiment of this application. As shown in FIG. 5, the method includes the following steps.

S101. When an inactivity timer corresponding to an active first BWP expires, determine whether a carrier in which the first BWP is located includes a second BWP in an active state.

In this embodiment of this application, the method may be performed by a terminal or a communications apparatus (e.g., a chip system) that can support the terminal in implementing the method. In this application, an example in which the terminal performs the method is used for description. In this case, steps S101 and S102 may both be performed by the terminal.

It should be noted that, in this embodiment of this application, the first BWP and the second BWP are different BWPs in a same carrier and the BWP may be a downlink BWP or an uplink BWP. For example, when the terminal is a signal receive end, the BWP is a downlink BWP. On the contrary, when the terminal is a signal transmit end, the BWP is an uplink BWP. In this application, an example in which a carrier is a downlink carrier and a BWP is a downlink BWP is used for description.

The method in FIG. 5 is applicable to a scenario in which a default BWP is configured by using a carrier as a unit. Configuring the default BWP by using the carrier as the unit means that a default BWP is configured in one carrier, for fallback from any active non-initial or non-default BWP in the carrier to the default BWP.

In this embodiment of this application, a timing duration of the inactivity timer may be determined by a total count value and a count granularity (or referred to as a unit of count). For example, when a total count value of an inactivity timer configured by the network device is 100, and a count granularity is 1 ms, a timing duration of the inactivity timer is 100 ms. For another example, when a total count value of an inactivity timer configured by the network device is 100, and a count granularity is one symbol, a timing duration of the inactivity timer is 100 symbols. A count granularity of each count of the inactivity timer may be 1 ms, 0.1 ms, one slot, or a duration of one symbol. This is not limited in this application. In this application, the timing duration of the inactivity timer may be related to a parameter of a BWP in the carrier. For example, the count granularity of the inactivity timer may be related to the parameter of the BWP in the carrier. For example, a value of a count granularity slot may be a slot value corresponding to a BWP with the largest/smallest slot value among all BWPs configured in the carrier.

In this embodiment of this application, the timing duration of the inactivity timer may be a carrier-specific timing duration or a BWP-specific timing duration. Correspondingly, the count granularity and the total count value of the inactivity timer may be a carrier-specific count granularity and a carrier-specific total count value of the inactivity timer, or a BWP-specific count granularity and a BWP-specific total count value of the inactivity timer. The following uses the timing duration of the inactivity timer as an example to explain the carrier-specific timing duration and the BWP-specific timing duration.

The carrier-specific timing duration means that timing durations of inactivity timers maintained for active non-default BWPs in a same carrier are the same. For example, it is assumed that one carrier includes three non-default BWPs, and one corresponding inactivity timer is maintained for each active non-default BWP. If a timing duration of the inactivity timer is set to a carrier-specific timing duration, the timing durations of the three inactivity timers separately maintained for the three non-default BWPs in the active state in the carrier are the same. For example, if the network device configures a timing duration of an inactivity timer in one carrier as 100 ms, a timing duration of an inactivity timer maintained when each non-default BWP in the carrier is activated is 100 ms. For another example, if the network device configures a timing duration of an inactivity timer in one carrier as 100 slots, a timing duration of an inactivity timer maintained when each non-default BWP in the carrier is activated is 100 slots. For example, a slot value is a slot value corresponding to a BWP with the largest slot value among all BWPs configured in the carrier. If the slot value corresponding to the BWP with the largest slot value among all the BWPs configured in the carrier is 0.5 ms, a timing duration of an inactivity timer maintained when each non-default BWP in the carrier is activated is 100 slots=50 ms. It may be understood that if the timing duration of the inactivity timer is a carrier-specific timing duration, correspondingly, a count granularity and a total count value of the inactivity timer are a carrier-specific count granularity and a carrier-specific total count value.

In this example, the timing duration of the inactivity timer corresponding to the BWP may be configured in an RRC information element configured by the network device in the carrier in which the corresponding BWP is located. A configuration parameter of the timing duration of the inactivity timer may be the duration or a value of another factor that determines the duration, for example, the total count value and/or the count granularity.

The BWP-specific timing duration means that the timing duration of the inactivity timer corresponds to the non-default BWP. For example, it is assumed that one carrier includes three non-default BWPs: a first non-default BWP, a second non-default BWP, and a third non-default BWP. A first inactivity timer is maintained for the active first non-default BWP, a second inactivity timer is maintained for the active second non-default BWP, and a third inactivity timer is maintained for the active third non-default BWP. If a timing duration of the inactivity timer in the carrier is set to a BWP-specific timing duration, the first inactivity timer, the second inactivity timer, and the third inactivity timer may correspond to three timing durations respectively. For example, the network device may configure, for the first non-default BWP, the timing duration of the inactivity timer corresponding to the first non-default BWP as 100 ms. The network device may configure, for the second non-default BWP, the timing duration of the inactivity timer corresponding to the second non-default BWP as 50 ms. The network device may configure, for the third non-default BWP, the timing duration of the inactivity timer corresponding to the third non-default BWP as 20 ms. In this example, the timing duration of the inactivity timer corresponding to the BWP may be configured in an RRC information element configured by the network device for the corresponding BWP. For another example, the network device may configure, for the first non-default BWP, the timing duration of the inactivity timer corresponding to the first non-default BWP as $100*slot_1$, where $slot_1$ is a slot value corresponding to a first default BWP. The network device may configure, for the second non-default BWP, the timing duration of the inactivity timer corresponding to the second non-default BWP as 50 $slot_2$, where $slot_2$ is a slot value corresponding to a second default BWP. The network device may configure, for the third non-default BWP, the timing duration of the inactivity timer corresponding to the third non-default BWP as 20 $slot_3$, where $slot_3$ is a slot value corresponding to a third default BWP. In this example, the timing duration of the inactivity timer corresponding to the BWP may be configured in an RRC information element configured by the network device for the corresponding BWP. For another example, the network device may configure a timing duration of an inactivity timer maintained for an active non-default BWP in a carrier as 100 $slot_1$, where slot is a slot value corresponding to the active non-default BWP. For example, if a slot corresponding to an active non-default BWP 1 is 1 ms, a timing duration of an inactivity timer maintained for the non-default BWP 1 is 100 ms. If a slot corresponding to an active non-default BWP 2 is 0.5 ms, a timing duration of an inactivity timer maintained for the non-default BWP 2 is 50 ms. In this example, the timing duration of the inactivity timer corresponding to the BWP may be configured in an RRC information element configured by the network device in a carrier in which the corresponding BWP is located, or may be configured in an RRC information element configured by the network device in a serving cell in which the corresponding BWP is located. It may be understood that if the timing duration of the inactivity timer is a BWP-specific timing duration, correspondingly, a count granularity and a total count value of the inactivity timer may be a BWP-specific count granularity and a BWP-specific total count value. In addition, timing durations of inactivity timers corresponding to different BWPs may be the same or may be different.

In this example, the timing duration of the inactivity timer corresponding to the BWP may be configured in an RRC information element configured by the network device for the corresponding BWP, or may be configured in an RRC information element configured by the network device in a carrier in which the corresponding BWP is located. A configuration parameter of the timing duration of the inactivity timer may be the duration or a value of another factor that determines the duration, for example, a total count value and/or a count granularity.

S102. When the carrier includes the second BWP in the active state, deactivate the first BWP.

In this embodiment of this application, the terminal deactivates the first BWP when determining that the carrier in which the first BWP is located includes the second BWP in the active state.

Deactivating the first BWP may be understood as performing a deactivation operation on the first BWP, so that the first BWP is switched from the active state to an inactive state after the first BWP is deactivated.

In this embodiment of this application, the second BWP may be a default BWP or an initial BWP. Certainly, the second BWP may alternatively be a non-default BWP or a non-initial BWP. It should be noted that the non-default BWP and the non-initial BWP are BWPs that are in the carrier and that are neither the default BWP nor the initial BWP.

In a possible implementation, when the second BWP is a non-default BWP or a non-initial BWP, the terminal may not activate the default BWP or the initial BWP in the carrier on the basis of performing S102. However, according to an existing method, after the inactivity timer corresponding to the active first BWP expires, a BWP switch procedure needs to be performed, and specifically, the first BWP is deactivated, and the default BWP or the initial BWP in the carrier is activated. However, according to the method in this application, only the first BWP is deactivated and an unnecessary BWP switch procedure can be avoided. Further, because the default BWP or the initial BWP is not activated in this method, the terminal does not need to monitor the default BWP or the initial BWP, and only needs to monitor a second BWP in a current carrier, thereby reducing overheads of monitoring the BWP by the terminal and reducing power consumption of the terminal in a communication process.

Certainly, when the second BWP is a default BWP or an initial BWP, the default BWP or the initial BWP in the carrier may not be activated.

It should be noted that in the foregoing implementation, when the default BWP is configured in the carrier, the default BWP is not activated. When no default BWP is configured in the carrier, the initial BWP is not activated.

The foregoing describes a processing process in which the terminal determines that the carrier in which the first BWP is located includes the second BWP in the active state. The following describes a processing process in which the terminal determines that the carrier in which the first BWP is located does not include the second BWP in the active state.

In a possible implementation, it is assumed that a default BWP is configured in the carrier in which the first BWP is located. When the inactivity timer corresponding to the active first BWP expires, and the terminal determines that the carrier in which the first BWP is located does not include the second BWP in the active state, the terminal deactivates the first BWP and activates the default BWP in the carrier. It may also be understood that the terminal performs a BWP switch from the first BWP to the default BWP in the carrier.

In this embodiment of this application, a quantity of default BWPs configured in a carrier is not limited. One default BWP may be configured in one carrier, or certainly, more than one default BWP may be configured in one carrier. The more than one default BWP configured in the carrier may be referred to as a default BWP group. When a default BWP group is configured in one carrier, that is, when there are at least two default BWPs in the carrier, the terminal may activate the default BWP in the carrier in the following manner.

Manner 1: The terminal activates all default BWPs, where there are at least default BWPs. It may also be understood that the terminal activates all BWPs in a default BWP group. In this manner, all default BWPs in one carrier may be in a same state, for example, in the active state simultaneously, or in the inactive state simultaneously. Optionally, in this manner, the network device may deactivate some default BWPs by sending a BWP switch command, so that all default BWPs in one carrier may be in different states. To be specific, some default BWPs are in the active state, and the other default BWPs are in the inactive state.

Manner 2: The terminal activates a BWP that is included in at least two default BWPs and that meets a preset rule. It may also be understood that the terminal activates a BWP in a default BWP group according to the preset rule. In this manner, all default BWPs in one carrier may be in different states. For example, one BWP in the default BWP group is in the active state, and another BWP in the default BWP group is in the inactive state; or one BWP in the default BWP group is in the inactive state, and another BWP in the default BWP group is in the active state.

The preset rule may include any one of the following:
a BWP index is the largest; a BWP index is the smallest; an SCS is the largest; an SCS is the smallest; a CP is the largest; a CP is the smallest; or a numerology is the same as a parameter of the currently deactivated first BWP.

For example, in the second manner, the terminal may activate one BWP whose BWP index is the largest, SCS is the largest, or CP is the largest and that is included in the at least two default BWPs, or may activate one BWP whose BWP index is the smallest, SCS is the smallest, or CP is the smallest and that is included in the at least two default BWPs, or may activate one BWP with a parameter that is the same as the parameter of the currently deactivated first BWP.

The parameter of the first BWP may include an SCS, a CP, and/or the like. For example, activating one BWP with a parameter that is the same as the parameter of the first BWP may be understood as activating one BWP with an SCS and/or a CP that are/is the same as the SCS and/or the CP of the first BWP.

It should be noted that, in the foregoing second manner, the terminal may also activate a plurality of BWPs that meet the preset rule. For example, if there are three default BWPs in the carrier, the terminal may activate two BWPs that are among the three default BWPs and that have SCSs and/or CPs the same as the SCS and/or the CP of the first BWP.

In another possible implementation, it is assumed that no default BWP is configured in the carrier in which the first BWP is located. When the inactivity timer corresponding to the active first BWP expires, and the terminal determines that the carrier in which the first BWP is located does not include the second BWP in the active state, the terminal deactivates the first BWP and activates the initial BWP in the carrier. It may also be understood that the terminal performs a BWP switch from the first BWP to the initial BWP in the carrier.

The following uses a specific example to describe the BWP processing method provided in Embodiment 1.

Figure 6A:
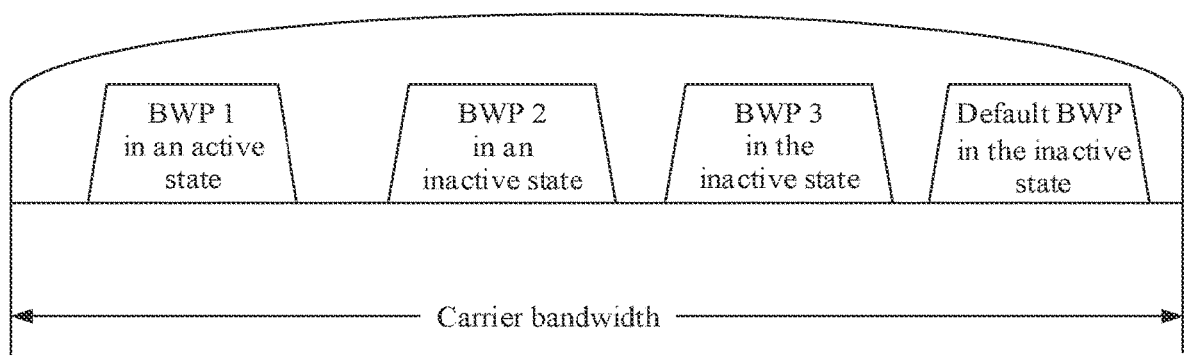
FIG. 6A to FIG. 6C are schematic diagrams of a bandwidth part processing method according to an embodiment of this application.

FIG. 6A is a schematic diagram of a bandwidth part processing method according to an embodiment of this application. Referring to FIG. 6A, one default BWP and three non-default BWPs are configured in one carrier in FIG. 6A, where the three non-default BWPs are respectively a BWP 1, a BWP 2, and a BWP 3. The BWP 1 is in an active state, and the BWP 2, the BWP 3, and the default BWP are all in an inactive state. After a corresponding inactivity timer maintained for the BWP 1 expires, if a terminal can determine that a current carrier does not include a second BWP in an active state, the terminal performs a BWP switch, that is, deactivates the BWP 1, and activates the default BWP.

Figure 6B:
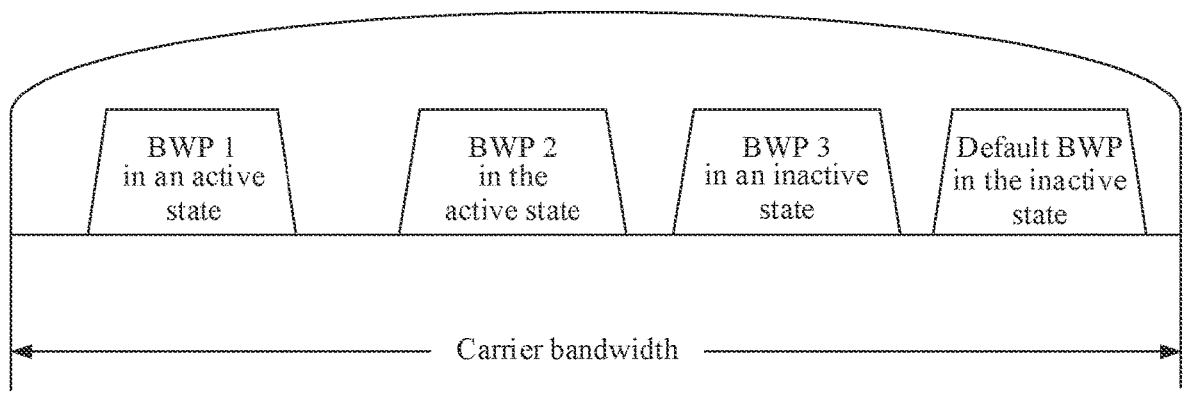

FIG. 6B is a schematic diagram of another bandwidth part processing method according to an embodiment of this application. Referring to FIG. 6B, one default BWP and three non-default BWPs are configured in one carrier in FIG. 6B, where the three non-default BWPs are respectively a BWP 1, a BWP 2, and a BWP 3. The BWP 1 and the BWP 2 are in an active state, and the BWP 3 and the default BWP are both in an inactive state. After a corresponding inactivity timer maintained for the BWP 1 expires, if a terminal can determine that a current carrier includes a second BWP in an active state (that is, the active BWP 2), the terminal only deactivates the BWP 1 and does not perform a BWP switch.

Figure 6C:
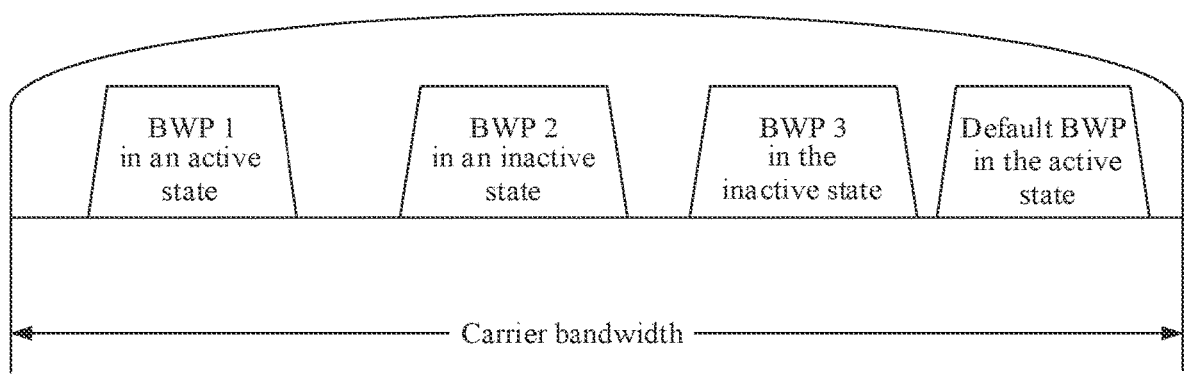

FIG. 6C is a schematic diagram of still another bandwidth part processing method according to an embodiment of this application. Referring to FIG. 6C, one default BWP and three non-default BWPs are configured in one carrier in FIG. 6C, where the three non-default BWPs are respectively a BWP 1, a BWP 2, and a BWP 3. The BWP 1 and the default BWP are both in an active state, and the BWP 2 and the BWP 3 are both in an inactive state. After a corresponding inactivity timer maintained for the BWP 1 expires, if a terminal can determine that a current carrier includes a second BWP in an active state (that is, the active default BWP), the terminal only deactivates the BWP 1 and does not perform a BWP switch.

In the embodiments of this application, that an inactivity timer corresponding to one active BWP expires is used as an example for description above. In actual application, inactivity timers respectively corresponding to a plurality of active BWPs in a current carrier may expire at the same time. In this case, the terminal determines whether the current carrier further includes the second BWP in the active state. If the current carrier further includes the second BWP in the active state, the terminal only deactivates the plurality of active BWPs. If the current carrier does not include the second BWP in the active state, the terminal performs a BWP switch, that is, deactivates the plurality of active BWPs, and activates the default BWP in the carrier.

In the embodiments of this application, the terminal may use different BWP processing methods based on different scenarios. The method in FIG. 5 is applicable to a scenario in which a default BWP is configured by using a carrier as a unit. The following describes a BWP processing method provided in this application in a scenario in which the default BWP is configured by using a BWP group as a unit.

Embodiment 2

1. Scenario 1 in which a Default BWP is Configured by Using a BWP Group as a Unit In this scenario, a plurality of BWPs included in one carrier may be configured as a plurality of BWP groups, so that one carrier may include at least two BWP groups, and each BWP group includes at least one BWP. The BWP group in the carrier may be configured by using signaling, for example, may be configured by using RRC signaling. Alternatively, the BWP group in the carrier may be pre-configured by using a predefined rule. For example, the predefined rule may include that BWPs in a same BWP group have a same parameter, or a same default BWP is configured for BWPs in a same BWP group. Alternatively, both the rules are met. In addition, a quantity of BWPs that are in an active state simultaneously and that are configured in each BWP group is 1 or 0. In other words, only one BWP group is configured for a terminal in a Rel-15 system, so that each BWP group is equivalent to one independent carrier in the Rel-15 system, and BWP groups are compatible with the Rel-15 system.

In addition, in this scenario, a quantity of default BWPs configured in each BWP group is not limited. The quantity of default BWPs configured in each BWP group may be configured by using the predefined rule or the signaling. For example, when the default BWP is configured by using the predefined rule, a BWP with the smallest bandwidth in one BWP group may be configured as the default BWP.

In this embodiment of this application, an example in which the quantity of default BWPs configured in each BWP group is 1 or 0 is used for description. The following describes a BWP processing method provided in this application in the scenario in which a default BWP is configured by using a BWP group as a unit.

Figure 7:
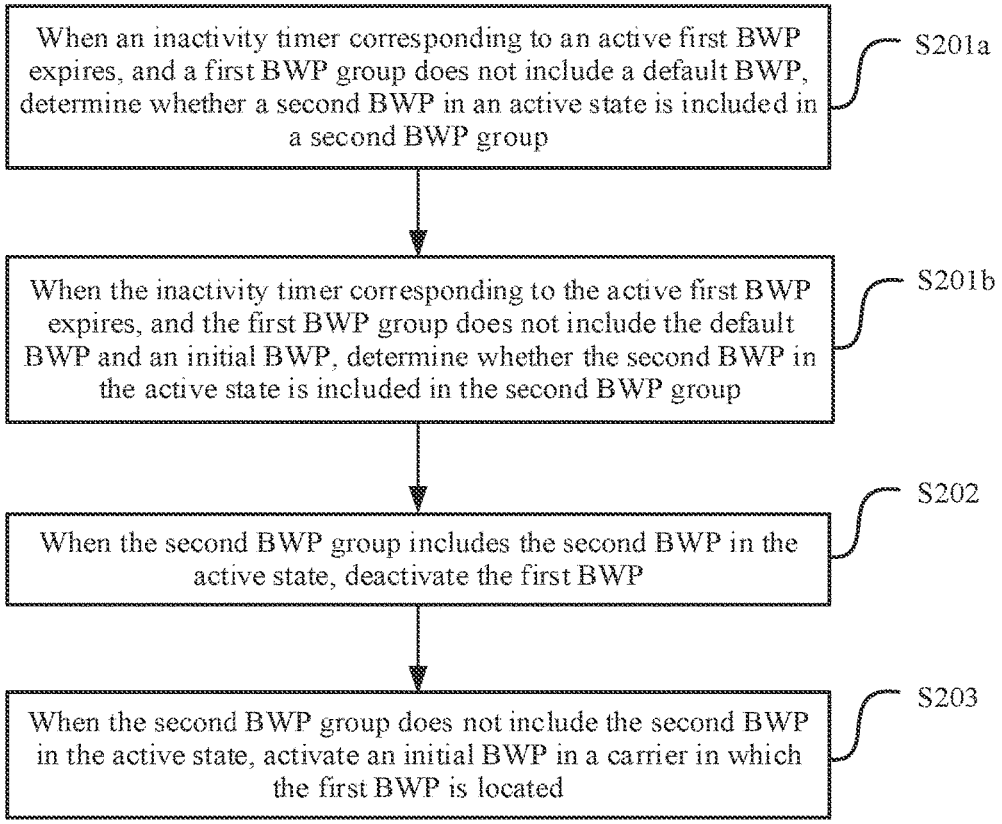
FIG. 7 is an implementation flowchart of another bandwidth part processing method according to an embodiment of this application.

FIG. 7 is an implementation flowchart of another bandwidth part processing method according to an embodiment of this application. As shown in FIG. 7, the method includes the following steps.

S201a. When an inactivity timer corresponding to an active first BWP expires, and a first BWP group does not include a default BWP, determine whether a second BWP in an active state is included in a second BWP group.

In Embodiment 2, the first BWP group is a BWP group that is in at least two BWP groups configured in a carrier and that includes the first BWP, and the second BWP group is a BWP group that is in the at least two BWP groups configured in the carrier and that does not include the first BWP.

In this embodiment of this application, a timing duration of the inactivity timer may be determined by a total count value and a count granularity (or referred to as a unit of count). The timing duration of the inactivity timer may be a carrier-specific timing duration, a BWP-specific timing duration, or a BWP group-specific timing duration. Similarly, the count granularity and the total count value of the inactivity timer may be a carrier-specific count granularity and a carrier-specific total count value, a BWP-specific count granularity and a BWP-specific total count value, or a BWP group-specific count granularity and a BWP group-specific total count value. For explanations of the carrier-specific count granularity and the carrier-specific total count value, and the BWP-specific count granularity and the BWP-specific total count value, refer to the descriptions in Embodiment 1. Details are not described herein again. For example, the BWP group-specific timing duration is explained by using the timing duration of the inactivity timer. In other words, the BWP group-specific timing duration means that timing durations of inactivity timers corresponding to BWPs in a same BWP group are the same.

In a possible implementation, the count granularity of the inactivity timer may be related to a parameter of a BWP in the BWP group. For example, the count granularity of the inactivity timer may be a length of one symbol on a BWP with the largest BWP index, the smallest BWP index, the largest SCS, or the smallest SCS in the BWP group.

S201a describes a possible implementation of determining whether the second BWP in the active state is included in the second BWP group. For example, when the inactivity timer corresponding to the active first BWP expires, a terminal can determine whether the first BWP group includes the default BWP, and if the first BWP group includes the default BWP, the terminal performs a BWP switch, that is, deactivates the first BWP and activates the default BWP. If the first BWP group does not include the default BWP, the terminal determines whether the second BWP in the active state is included in the second BWP group.

It should be noted that, in Embodiment 2, an initial BWP may be further configured in a carrier in which the first BWP is located, and the initial BWP may belong to a BWP group, or may not belong to any BWP group. S201a may be used in a scenario in which the initial BWP does not belong to any BWP group.

The following S201b provides another possible implementation of determining whether the second BWP in the active state is included in the second BWP group. S201b may be used in a scenario in which the initial BWP belongs to a BWP group.

S201b. When the inactivity timer corresponding to the active first BWP expires, and the first BWP group does not include the default BWP and the initial BWP, determine whether the second BWP in the active state is included in the second BWP group. In this implementation, meanings of the first BWP group and the second BWP group are the same as meanings of the first BWP group and the second BWP group in S201a. Details are not described herein again.

For example, when the inactivity timer corresponding to the active first BWP expires, the terminal can determine whether the first BWP group includes the default BWP, and if the first BWP group includes the default BWP, the terminal deactivates the first BWP and activates the default BWP. If the first BWP group does not include the default BWP, the terminal further determines whether the initial BWP is included in the first BWP group. If the first BWP group includes the default BWP, the terminal deactivates the first BWP and activates the initial BWP. If the first BWP group includes neither the default BWP nor the initial BWP, the terminal determines whether the second BWP in the active state is included in the second BWP group.

It should be noted that S201a and S201b are two implementations for different scenarios. In actual application, the terminal may apply one of the implementations based on an actual scenario.

S202. When the second BWP group includes the second BWP in the active state, deactivate the first BWP. According to this method, only the first BWP is deactivated, but a BWP switch is not performed. For example, the initial BWP in the carrier is no longer activated, so that an unnecessary BWP switch procedure can be avoided, thereby reducing overheads of monitoring the BWP by the terminal device and reducing power consumption of the terminal.

S203. When the second BWP group does not include the second BWP in the active state, activate the initial BWP in the carrier in which the first BWP is located.

The following uses a specific example to describe the BWP processing method provided in Embodiment 2.

Figure 8:
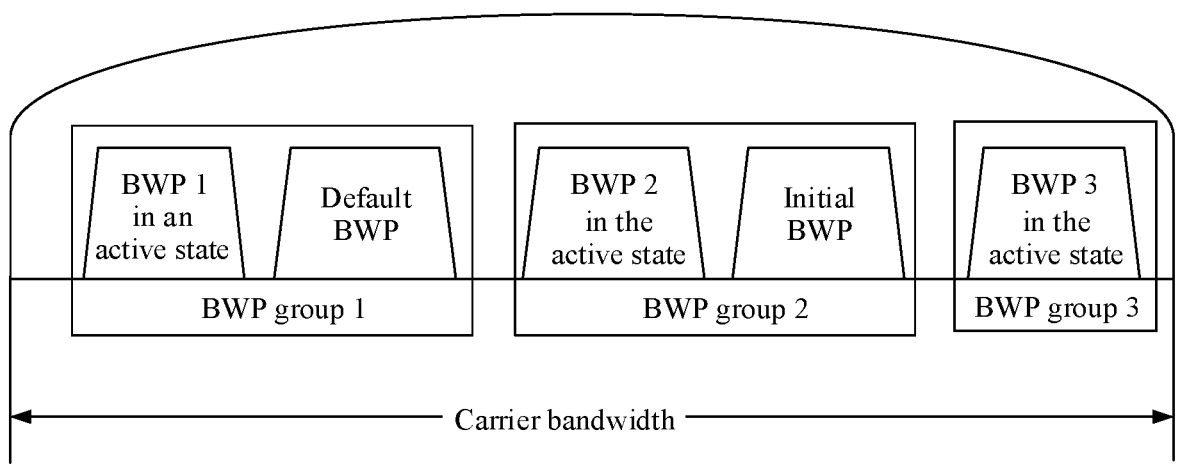
FIG. 8 is a schematic diagram of still another bandwidth part processing method according to an embodiment of this application.

FIG. 8 is a schematic diagram of still another bandwidth part processing method according to an embodiment of this application. Referring to FIG. 8, three BWP groups are configured in one carrier in FIG. 8, where the three BWP groups are respectively a BWP group 1, a BWP group 2, and a BWP group 3. A default BWP is configured in the BWP group 1, an initial BWP is configured in the BWP group 2, and no default BWP is configured in the BWP group 3. In addition, the BWP group 1 further includes an active BWP 1, the BWP group 2 further includes an active BWP 2, and the BWP group 3 includes an active BWP 3. When an inactivity timer corresponding to the active BWP 1 in the BWP group 1 expires, according to the method in Embodiment 2, a terminal can determine that the BWP group 1 includes the default BWP. Therefore, the terminal deactivates the BWP 1 and activates the default BWP in the BWP group 1. When an inactivity timer corresponding to the active BWP 2 in the BWP group 2 expires, according to the method in Embodiment 2, the terminal can determine that the BWP group 2 does not include the default BWP but includes the initial BWP. Therefore, the terminal deactivates the BWP 2 and activates the initial BWP. When an inactivity timer corresponding to the active BWP 3 in the BWP group 3 expires, according to the method in Embodiment 2, the terminal can determine that the BWP group 3 includes neither the default BWP nor the initial BWP. Therefore, the terminal can determine whether a second BWP in an active state is included in the BWP group 1 and the BWP group 2. If the BWP group 1 and the BWP group 2 include the second BWP in the active state, only the BWP 3 is deactivated. Otherwise, if the BWP group 1 and the BWP group 2 do not include the second BWP in the active state, a BWP switch is performed, that is, the BWP 3 is deactivated and an initial BWP in a current carrier is activated.

Embodiment 3

2. Scenario 2 in which a Default BWP is Configured by Using a BWP Group as a Unit In this scenario, a plurality of BWPs included in one carrier may be configured as a plurality of BWP groups, so that one carrier may include at least two BWP groups, and each BWP group includes at least one BWP. The BWP group in the carrier may be configured by using signaling, for example, may be configured by using RRC signaling. Alternatively, the BWP group in the carrier may be pre-configured by using a predefined rule. For example, the predefined rule may include that BWPs in a same BWP group have a same parameter, or a same default BWP is configured for BWPs in a same BWP group. Alternatively, both the rules are met. In addition, it may be configured in such a manner that one BWP group includes a plurality of BWPs in an active state simultaneously in this scenario.

The following describes another BWP processing method provided in this application in the scenario in which a default BWP is configured by using a BWP group as a unit.

Figure 9:
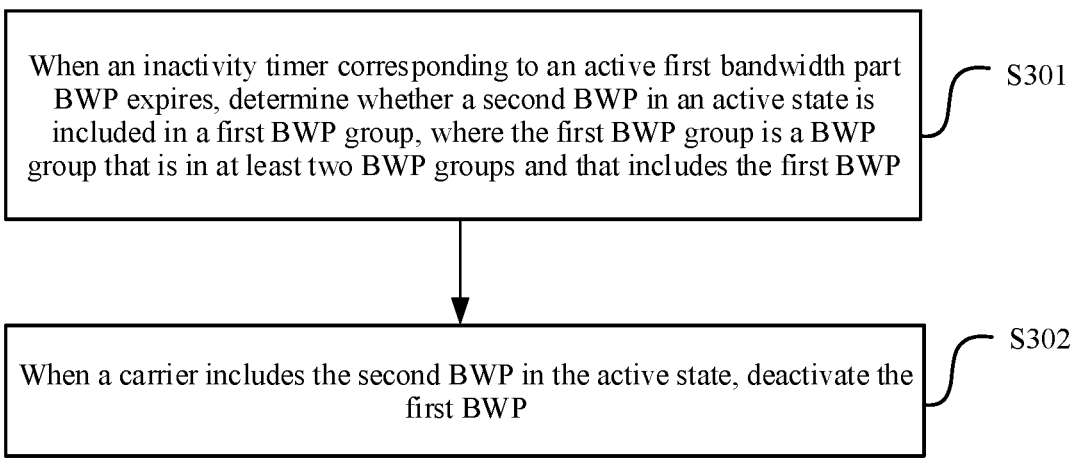
FIG. 9 is an implementation flowchart of still another bandwidth part processing method according to an embodiment of this application.

FIG. 9 is an implementation flowchart of still another bandwidth part processing method according to an embodiment of this application. As shown in FIG. 9, the method includes the following steps.

S301. When an inactivity timer corresponding to an active first bandwidth part BWP expires, determine whether a second BWP in an active state is included in a first BWP group, where the first BWP group is a BWP group that is in at least two BWP groups and that includes the first BWP.

In Embodiment 3, the first BWP group is a BWP group that is in the at least two BWP groups configured in a carrier and that includes the first BWP, and a second BWP group is a BWP group that is in the at least two BWP groups configured in the carrier and that does not include the first BWP.

In Embodiment 3, a timing duration of the inactivity timer may further be determined by a total count value and a count granularity (or referred to as a unit of count). The timing duration of the inactivity timer may be a carrier-specific timing duration, a BWP-specific timing duration, or a BWP group-specific timing duration. Similarly, the count granularity and the total count value of the inactivity timer may be a carrier-specific count granularity and a carrier-specific total count value, a BWP-specific count granularity and a BWP-specific total count value, or a BWP group-specific count granularity and a BWP group-specific total count value. For explanations of the carrier-specific count granularity and the carrier-specific total count value, and the BWP-specific count granularity and the BWP-specific total count value, and the BWP group-specific count granularity and the BWP group-specific total count value, refer to the descriptions in Embodiment 1 and Embodiment 2. Details are not described herein again.

In a possible implementation, the count granularity of the inactivity timer may be related to a parameter of a BWP in the BWP group. For example, the count granularity of the inactivity timer may be a length of one symbol on a BWP with the largest BWP index, the smallest BWP index, the largest SCS, or the smallest SCS in the BWP group.

S302. When the carrier includes the second BWP in the active state, deactivate the first BWP.

The foregoing describes a case in which a default BWP is configured for a non-default BWP in a carrier, that is, a non-default BWP is associated with a default BWP. When no default BWP is configured for the non-default BWP in the carrier, if an inactivity timer corresponding to the non-default BWP expires, a terminal can determine whether a current carrier includes another active BWP. If the current carrier includes the another active BWP, the terminal does not perform a BWP switch. This can avoid an unnecessary BWP switch procedure.

It should be noted that how to map a plurality of BWPs to a same default BWP is not limited in Embodiment 3. For example, a non-default BWP corresponding to a same parameter (for example, an SCS and/or a CP) may be mapped to a same default BWP in a manner predefined in a protocol.

The BWP processing method provided in Embodiment 3 is described below by using an example in which non-default BWPs that are in one carrier and that correspond to a same default BWP are configured as one BWP group. In this case, it may be understood that each BWP group includes one default BWP.

Figure 10:
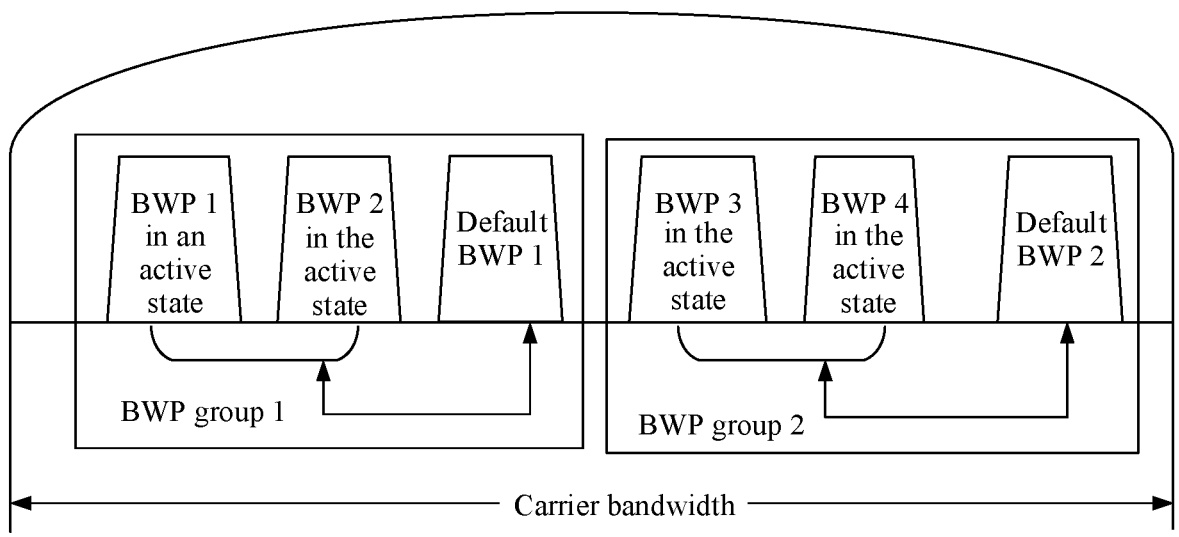
FIG. 10 is a schematic diagram of still another bandwidth part processing method according to an embodiment of this application.

FIG. 10 is a schematic diagram of still another bandwidth part processing method according to an embodiment of this application. Referring to FIG. 10, six BWPs are configured in one carrier in FIG. 10, including four non-default BWPs: a BWP 1, a BWP 2, a BWP 3, and a BWP 4, and two default BWPs: a default BWP 1 and a default BWP 2. The BWP 1 and the BWP 2 correspond to the same default BWP 1, and the BWP 3 and the BWP 4 correspond to the same default BWP 2. When an inactivity timer corresponding to the BWP 1 expires, according to the method in Embodiment 3, a terminal can determine whether a second BWP in an active state is included in a BWP group to which the BWP 1 belongs. It can be learned from FIG. 10 that the BWP group 1 to which the BWP 1 belongs includes the BWP 2 in the active state. Therefore, the terminal only deactivates the BWP 1 and does not perform a BWP switch. In addition, if the BWP 2 in FIG. 10 is in an inactive state, the terminal performs a BWP switch, that is, deactivates the BWP 1 and activates the default BWP 1.

The foregoing mainly describes the solutions provided in the embodiments of this application from a perspective of the terminal. It may be understood that, to implement the foregoing functions, the terminal includes corresponding hardware structures and/or software modules for performing the functions. With reference to units and algorithm steps in the examples described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, function unit division may be performed on the terminal based on the foregoing method examples. For example, each function unit may be obtained through division based on a corresponding function, or two or more functions may be integrated into one processing unit. The integrated unit may be implemented in a form of hardware, or may be implemented in a form of a software function unit.

Based on a same inventive concept, the embodiments of this application further provide an apparatus configured to implement any one of the foregoing methods. For example, an apparatus is provided, and includes units (or means) configured to implement the steps performed by the terminal in any one of the foregoing methods.

Figure 11:
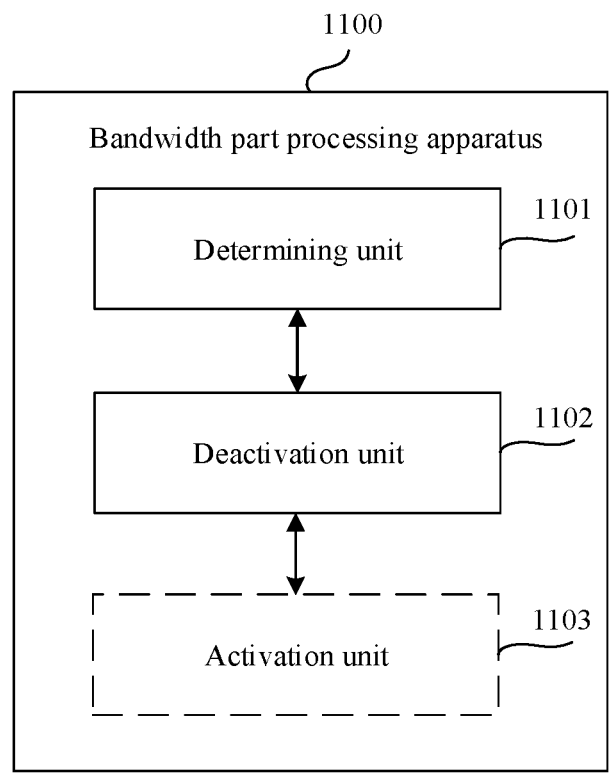
FIG. 11 is a schematic structural diagram of a bandwidth part processing apparatus according to an embodiment of this application.

In a possible implementation, an embodiment of this application provides a bandwidth part processing apparatus 1100. The bandwidth part processing apparatus 1100 may be used in a terminal. FIG. 11 is a schematic structural diagram of the bandwidth part processing apparatus 1100 according to an embodiment of this application. Referring to FIG. 11, the bandwidth part processing apparatus 1100 includes a determining unit 1101 and a deactivation unit 1102. The determining unit 1101 may be configured to: when an inactivity timer corresponding to an active first BWP expires, determine whether a carrier in which the first BWP is located includes a second BWP in an active state; and the deactivation unit 1102 may be configured to: when the carrier includes the second BWP in the active state, deactivate the first BWP.

The first BWP and the second BWP in the bandwidth part processing apparatus 1100 are different BWPs in a same carrier, and the BWP may be a downlink BWP or an uplink BWP. In this application, an example in which a carrier is a downlink carrier and a BWP is a downlink BWP is used for description.

Optionally, a timing duration of the inactivity timer may be determined by a total count value and a count granularity (or referred to as a unit of count).

Optionally, the timing duration of the inactivity timer may be a carrier-specific timing duration or a BWP-specific timing duration. Correspondingly, the count granularity and the total count value of the inactivity timer may be a carrier-specific count granularity and a carrier-specific total count value, or a BWP-specific count granularity and a BWP-specific total count value.

In this embodiment of this application, the timing duration of the inactivity timer may be related to a parameter of a BWP in the carrier. For example, the count granularity of the inactivity timer may be related to the parameter of the BWP in the carrier. For example, if the count granularity is a slot, a slot value may be a slot value corresponding to a BWP with the largest/smallest slot value among all BWPs configured in the carrier.

In a possible implementation, the second BWP may be a default BWP or an initial BWP.

In another possible implementation, the second BWP may alternatively be a non-default BWP or a non-initial BWP.

In a possible implementation, when the second BWP is a non-default BWP or a non-initial BWP, the deactivation unit 1102 may not activate the default BWP or the initial BWP in the carrier on the basis of deactivating the first BWP. For example, when the default BWP is configured in the carrier, the deactivation unit 1102 may not activate the default BWP. When no default BWP is configured in the carrier, the deactivation unit 1102 may not activate the initial BWP.

Certainly, when the second BWP is a default BWP or an initial BWP, the deactivation unit 1102 may not activate the default BWP or the initial BWP in the carrier on the basis of deactivating the first BWP.

The foregoing describes only a processing process in which the determining unit 1101 determines that the carrier in which the first BWP is located includes the second BWP in the active state. The following describes a processing process in which the determining unit 1101 determines that the carrier in which the first BWP is located does not include the second BWP in the active state.

In a possible implementation, the bandwidth part processing apparatus 1100 may further include an activation unit 1103. In specific implementation, the deactivation unit 1102 and the activation unit 1103 may be integrated into one unit, or may be independent units. In this implementation, it is assumed that a default BWP is configured in the carrier in which the first BWP is located. When the inactivity timer corresponding to the active first BWP expires, and the determining unit 1101 determines that the carrier in which the first BWP is located does not include the second BWP in the active state, the deactivation unit 1102 deactivates the first BWP and the activation unit 1103 activates the default BWP in the carrier. It may also be understood that the deactivation unit 1102 and the activation unit 1103 perform a BWP switch from the first BWP to the default BWP in the carrier.

In this embodiment of this application, a quantity of default BWPs configured in a carrier is not limited. One default BWP may be configured in one carrier, or certainly, more than one default BWP may be configured in one carrier. The more than one default BWP configured in the carrier may be referred to as a default BWP group. When a default BWP group is configured in one carrier, the activation unit 1103 may activate the default BWP in the carrier in the following manner.

Manner 1: The activation unit 1103 may activate all default BWPs, where there are at least one default BWPs. In this manner, all default BWPs in one carrier may be in a same state, for example, in the active state simultaneously, or in an inactive state simultaneously. Optionally, in this manner, a network device may deactivate some default BWPs by sending a BWP switch command, so that all default BWPs in one carrier may be in different states. To be specific, some default BWPs are in the active state, and the other default BWPs are in the inactive state.

Manner 2: The activation unit 1103 may be configured to active a BWP that is included in at least two default BWPs and that meets a preset rule. In this manner, all default BWPs in one carrier may be in different states. For example, one BWP in the default BWP group is in the active state, and another BWP in the default BWP group is in the inactive state; or one BWP in the default BWP group is in the inactive state, and another BWP in the default BWP group is in the active state.

The preset rule may include any one of the following:
a BWP index is the largest; a BWP index is the smallest; an SCS is the largest; an SCS is the smallest; a CP is the largest; a CP is the smallest; or a numerology is the same as a parameter of the currently deactivated first BWP.

For example, in the second manner, the activation unit 1103 may activate one BWP whose BWP index is the largest, SCS is the largest, or CP is the largest and that is included in the at least two default BWPs, or may activate one BWP whose BWP index is the smallest, SCS is the smallest, or CP is the smallest and that is included in the at least two default BWPs, or may activate one BWP with a parameter that is the same as the parameter of the currently deactivated first BWP.

Optionally, the parameter of the first BWP may include an SCS and/or a CP. For example, activating one BWP with a parameter that is the same as the parameter of the first BWP may be understood as activating one BWP with an SCS and/or a CP that are/is the same as the SCS and/or the CP of the first BWP.

It should be noted that in the foregoing second manner, the activation unit 1103 may activate one or more BWPs that meet the preset rule. For example, if there are three default BWPs in the carrier, the activation unit 1103 may activate two BWPs that are among the three default BWPs and that have SCSs and/or CPs the same as the SCS and/or the CP of the first BWP.

In another possible implementation, it is assumed that no default BWP is configured in the carrier in which the first BWP is located. When the inactivity timer corresponding to the active first BWP expires, and the determining unit 1101 determines that the carrier in which the first BWP is located does not include the second BWP in the active state, the deactivation unit 1102 deactivates the first BWP and the activation unit 1103 activates the initial BWP in the carrier.

The following describes a scenario in which a default BWP is configured by using a BWP group as a unit.

1. Scenario 1 in which a Default BWP is Configured by Using a BWP Group as a Unit In this scenario, a plurality of BWPs included in one carrier may be configured as a plurality of BWP groups, so that one carrier may include at least two BWP groups, and each BWP group includes at least one BWP. The BWP group in the carrier may be configured by using signaling. Alternatively, the BWP group in the carrier may be pre-configured by using a predefined rule. In addition, a quantity of BWPs that are in the active state simultaneously and that are configured in each BWP group is 1 or 0.

In addition, in this scenario, a quantity of default BWPs configured in each BWP group is not limited. The quantity of default BWPs configured in each BWP group may be configured by using the predefined rule or the signaling.

In a possible implementation, the quantity of default BWPs configured in each BWP group is 1 or 0.

It should be noted that, in the scenario, an initial BWP may be further configured in the carrier in which the first BWP is located, and the initial BWP may belong to a BWP group, or may not belong to any BWP group.

In a possible implementation, the initial BWP does not belong to any BWP group. The determining unit 1101 is further configured to:
when the inactivity timer corresponding to the active first BWP expires, and a first BWP group does not include the default BWP, determine whether the second BWP in the active state is included in a second BWP group.

The deactivation unit 1102 is further configured to:
when the second BWP group includes the second BWP in the active state, deactivate the first BWP.

The activation unit 1103 is further configured to:
when the second BWP group does not include the second BWP in the active state, activate the initial BWP in the carrier in which the first BWP is located.

In addition, if the first BWP group includes the default BWP, a BWP switch may be performed. Specifically, the deactivation unit 1102 is configured to deactivate the first BWP and the activation unit 1103 is configured to activate the default BWP.

In a possible implementation, the initial BWP belongs to a BWP group. The determining unit 1101 may be further configured to:
when the inactivity timer corresponding to the active first BWP expires, and the first BWP group does not include the default BWP and the initial BWP, determine whether the second BWP in the active state is included in the second BWP group.

The deactivation unit 1102 may be further configured to:
when the second BWP group includes the second BWP in the active state, deactivate the first BWP.

The activation unit 1103 may be further configured to:
when the second BWP group does not include the second BWP in the active state, activate the initial BWP in the carrier in which the first BWP is located.

In addition, if the first BWP group includes the default BWP, a BWP switch is performed. Specifically, the deactivation unit 1102 deactivates the first BWP and the activation unit 1103 activates the default BWP. If the first BWP group does not include the default BWP but includes the initial BWP, a BWP switch is performed. Specifically, the deactivation unit 1102 deactivates the first BWP and the activation unit 1103 activates the initial BWP.

The first BWP group is a BWP group that is in the at least two BWP groups configured in the carrier and that includes the first BWP, and the second BWP group is a BWP group that is in the at least two BWP groups configured in the carrier and that does not include the first BWP.

In this scenario, a timing duration of the inactivity timer may be determined by a total count value and a count granularity (or referred to as a unit of count). The timing duration of the inactivity timer may be a carrier-specific timing duration, a BWP-specific timing duration, or a BWP group-specific timing duration. Correspondingly, the count granularity and the total count value of the inactivity timer may be a carrier-specific count granularity and a carrier-specific total count value, a BWP-specific count granularity and a BWP-specific total count value, or a BWP group-specific count granularity and a BWP group-specific total count value.

In a possible implementation, the timing duration of the inactivity timer may be related to a parameter of a BWP in the carrier. For example, the count granularity of the inactivity timer may be related to the parameter of the BWP in the BWP group. For example, if the count granularity is a slot, a slot value may be a slot value corresponding to a BWP with the largest/smallest slot value among all BWPs configured in the carrier. For another example, the count granularity of the inactivity timer may be a length of one symbol on a BWP with the largest BWP index, the smallest BWP index, the largest SCS, or the smallest SCS in the BWP group.

2. Scenario 2 in which a Default BWP is Configured by Using a BWP Group as a Unit In this scenario, a plurality of BWPs included in one carrier may be configured as a plurality of BWP groups, so that one carrier may include at least two BWP groups, and each BWP group includes at least one BWP. The BWP group in the carrier may be configured by using signaling. Alternatively, the BWP group in the carrier may be pre-configured by using a predefined rule. For example, the predefined rule may include that BWPs in a same BWP group have a same parameter, or a same default BWP is configured for BWPs in the same BWP group. In addition, it may be configured in such a manner that one BWP group includes a plurality of BWPs in the active state simultaneously in this scenario.

In a possible implementation, the determining unit 1101 may be further configured to:
when the inactivity timer corresponding to the active first bandwidth part BWP expires, determine whether the second BWP in the active state is included in a first BWP group, where the first BWP group is a BWP group that is in the at least two BWP groups and that includes the first BWP.

The deactivation unit 1102 may be further configured to:
when the carrier includes the second BWP in the active state, deactivate the first BWP.

The first BWP group is a BWP group that is in the at least two BWP groups configured in the carrier and that includes the first BWP, and the second BWP group is a BWP group that is in the at least two BWP groups configured in the carrier and that does not include the first BWP.

In this scenario, a timing duration of the inactivity timer may be determined by a total count value and a count granularity (or referred to as a unit of count). The timing duration of the inactivity timer may be a carrier-specific timing duration, a BWP-specific timing duration, or a BWP group-specific timing duration. Correspondingly, the count granularity and the total count value of the inactivity timer may be a carrier-specific count granularity and a carrier-specific total count value, a BWP-specific count granularity and a BWP-specific total count value, or a BWP group-specific count granularity and a BWP group-specific total count value.

In a possible implementation, the timing duration of the inactivity timer may be related to a parameter of a BWP in the carrier. For example, the count granularity of the inactivity timer may be related to the parameter of the BWP in the carrier. For example, if the count granularity is a slot, a slot value may be a slot value corresponding to a BWP with the largest/smallest slot value among all BWPs configured in the carrier. For another example, the count granularity of the inactivity timer may be a length of one symbol on a BWP with the largest BWP index, the smallest BWP index, the largest SCS, or the smallest SCS in the BWP group.

The foregoing describes a case in which a default BWP is configured for a non-default BWP in a carrier. When no default BWP is configured for the non-default BWP in the carrier, if an inactivity timer corresponding to the non-default BWP expires, the determining unit 1101 may determine whether a current carrier includes another active BWP. If the current carrier includes the another active BWP, a BWP switch is not performed. This can avoid an unnecessary BWP switch procedure.

How to map a plurality of BWPs to a same default BWP is not limited in this application. For example, a non-default BWP corresponding to a same parameter (e.g., an SCS and/or a CP) may be mapped to a same default BWP in a manner predefined in a protocol.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. Alternatively, each unit may be stored in a memory in a form of a program to be invoked by a processing element of the apparatus to perform a function of the unit. In addition, all or some of the units may be integrated together, or may be implemented independently. The processing element herein may also be referred to as a processor, and may be an integrated circuit having a signal processing capability. In an implementation process, the steps of the foregoing methods or the foregoing units may be implemented by using an integrated logic circuit of hardware in the processing element, or may be implemented in a form of software invoked by the processing element.

In an example, a unit in any one of the foregoing apparatuses may be one or more integrated circuits configured to implement the foregoing methods, for example, one or more specific integrated circuits (ASIC), one or more microprocessors (DSP), one or more field programmable gate arrays (FPGA), or a combination of at least two of these types of integrated circuits. For another example, when the unit in the apparatus is implemented by scheduling a program by a processing element, the processing element may be a general-purpose processor, for example, a central processing unit (CPU) or another processor that can invoke the program. For still another example, the units may be integrated together and implemented in a form of a system-on-a-chip (SOC).

Figure 12:
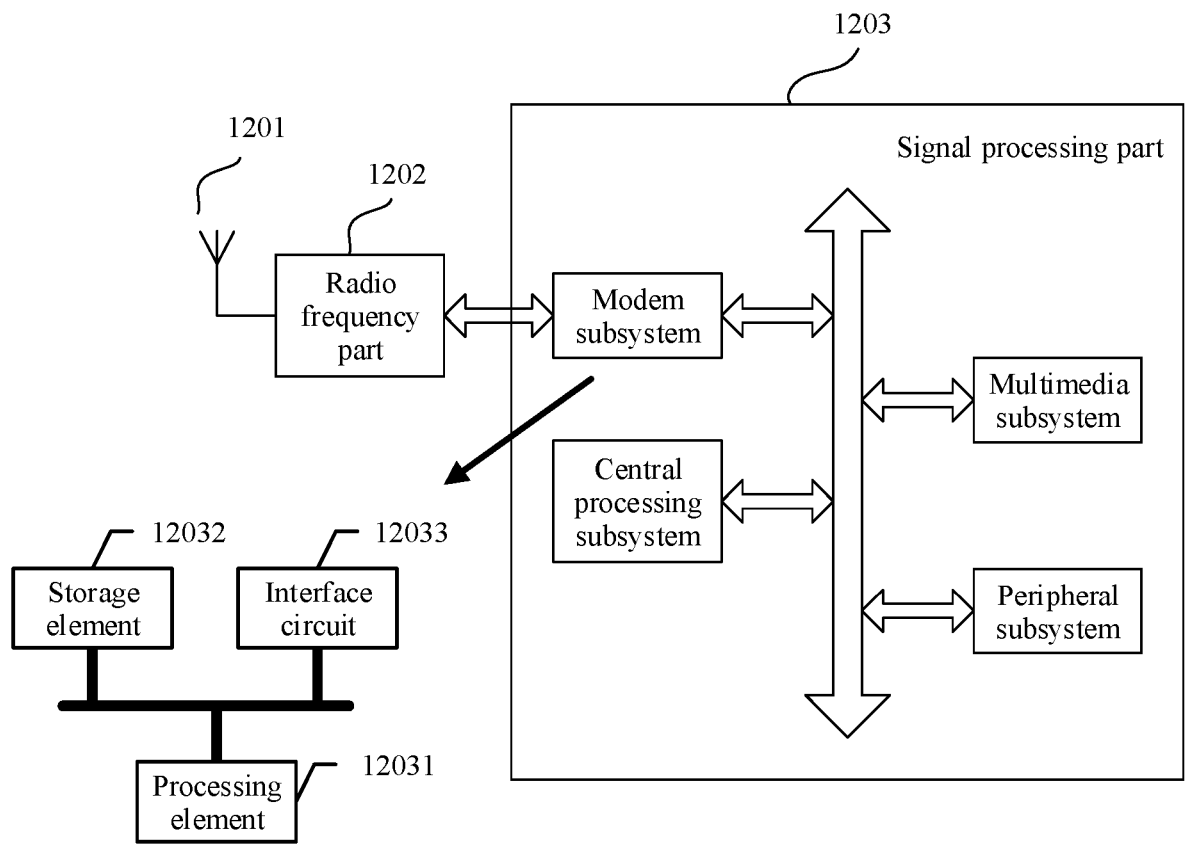
FIG. 12 is a schematic diagram of a terminal according to an embodiment of this application.

FIG. 12 is a schematic structural diagram of a terminal according to an embodiment of this application. The terminal may be the terminal in the foregoing embodiments and is configured to implement operations of the terminal in the foregoing embodiments. As shown in FIG. 12, the terminal includes an antenna 1201, a radio frequency part 1202, and a signal processing part 1203. The antenna 1201 is connected to the radio frequency part 1202. In a downlink direction, the radio frequency part 1202 receives, through the antenna 1201, information sent by a network device, and sends, to the signal processing part 1203 for processing, the information sent by the network device. In an uplink direction, the signal processing part 1203 processes information from the terminal, and sends the information to the radio frequency part 1202. The radio frequency part 1202 processes the information from the terminal, and then sends the processed information to the network device through the antenna 1201.

The signal processing part 1203 may include a modem subsystem, configured to implement processing of data at each communications protocol layer. The signal processing part 1203 may further include a central processing subsystem, configured to implement processing of an operating system and an application layer of the terminal. In addition, the signal processing part 1203 may further include another subsystem, for example, a multimedia subsystem or a peripheral subsystem. The multimedia subsystem is configured to implement controlling of a camera or a screen display of the terminal, and the peripheral subsystem is configured to implement a connection to another device. The modem subsystem may be a separately disposed chip. Optionally, the foregoing apparatus used for the terminal may be located in the modem subsystem.

The modem subsystem may include one or more processing elements 12031, for example, include one main control CPU and another integrated circuit. In addition, the modem subsystem may further include a storage element 12032 and an interface circuit 12033. The storage element 12032 is configured to store data and a program. However, a program used to perform the methods performed by the terminal in the foregoing methods may not be stored in the storage element 12032, but is stored in a memory outside the modem subsystem, and is loaded and used by the modem subsystem when to be used. The interface circuit 12033 is configured to communicate with another subsystem. The foregoing apparatus used for the terminal may be located in the modem subsystem. The modem subsystem may be implemented by using a chip. The chip includes at least one processing element and interface circuit. The processing element is configured to perform the steps of any one of the methods performed by the terminal. The interface circuit is configured to communicate with another apparatus. In an implementation, units of the terminal to implement the steps of the foregoing methods may be implemented by a processing element invoking a program. For example, the apparatus used in the terminal includes a processing element and a storage element. The processing element invokes a program stored in the storage element, to perform the methods performed by the terminal in the foregoing method embodiments. The storage element may be a storage element located on a same chip as the processing element, that is, an on-chip storage element.

In another implementation, the program used to perform the methods performed by the terminal in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal in the foregoing method embodiments.

In still another implementation, units of the apparatus used in the terminal to implement the steps of the foregoing methods may be configured as one or more processing elements. These processing elements are disposed on the modem subsystem. The processing element herein may be an integrated circuit, for example, one or more ASICs, one or more DSPs, or one or more FPGAs, or a combination of these types of integrated circuits. These integrated circuits may be integrated together to form a chip.

The units of the terminal to implement the steps of the foregoing methods may be integrated together, and implemented in a form of a system-on-a-chip (SOC). The SOC chip is configured to implement the foregoing methods. At least one processing element and at least one storage element may be integrated into the chip, and the processing element invokes a program stored in the storage element to implement the foregoing methods performed by the terminal. Alternatively, at least one integrated circuit may be integrated into the chip, to implement the foregoing methods performed by the terminal. Alternatively, with reference to the foregoing implementations, functions of some units may be implemented by the processing element invoking a program, and functions of some units may be implemented in a form of the integrated circuit.

It can be learned that the foregoing apparatus used in the terminal may include at least one processing element and interface circuit. The at least one processing element is configured to perform any one of the methods that are provided in the foregoing method embodiments and performed by the terminal. The processing element may perform some or all steps performed by the terminal, in a first manner, to be specific, by invoking the program stored in the storage element; or may perform some or all steps performed by the terminal, in a second manner, to be specific, by using an integrated logic circuit of hardware in the processing element in combination with instructions; or may certainly perform, by combining the first manner and the second manner, some or all steps performed by the terminal.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

According to the methods provided in the embodiments of this application, an embodiment of this application further provides a communications system, including the foregoing one or more terminals. Optionally, the communications system may further include a network device.

An embodiment of this application further provides a bandwidth part processing apparatus used in a terminal. The bandwidth part processing apparatus includes at least one processing element (or a chip) configured to perform the foregoing method embodiments.

This application provides a bandwidth part processing program, where when the program is executed by a processor, the program is used to perform the methods in the foregoing embodiments.

This application further provides a program product, for example, a computer-readable storage medium, including the program used in the foregoing bandwidth part processing methods.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

Embodiments of this application are described with reference to flowcharts and/or block diagrams of the method, a device (system), and a computer program product according to the embodiments of this application. It should be understood that computer program instructions may be used to implement each process and/or each block in the flowcharts and/or the block diagrams and a combination of the process and/or the block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded on the computer or another programmable data processing device, so that a series of operation steps are performed on the computer or the another programmable device, thereby generating computer-implemented processing. Therefore, the instructions executed on the computer or the another programmable device provide steps for implementing the specific function in the one or more processes in the flowcharts and/or in the one or more blocks in the block diagrams.

It is clear that a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. An apparatus, comprising:
a memory, configured to store a computer program; and
at least one processor, configured to execute the computer program stored in the memory, to perform operations comprising:
responsive to expiration of an inactivity timer corresponding to an active first bandwidth part (BWP), determining whether a carrier in which the first BWP is located comprises a second BWP in an active state, wherein the carrier comprises at least two BWP groups, each BWP group comprises at least one BWP, and a quantity of BWPs in the active state in each BWP group simultaneously is 1 or 0; and
responsive to determining that the carrier comprises the second BWP in the active state, deactivating the first BWP,
wherein the determining whether the carrier in which the first BWP is located comprises the second BWP in the active state comprises:
responsive to determining that a first BWP group does not comprise a default BWP, determining whether the second BWP in the active state is comprised in a second BWP group; or
responsive to determining that the first BWP group does not comprise the default BWP and an initial BWP, determining whether the second BWP in the active state is comprised in the second BWP group,
wherein the first BWP group is a BWP group that is in the at least two BWP groups and that comprises the first BWP, and the second BWP group is a BWP group that is in the at least two BWP groups and that does not comprise the first BWP.

2. The apparatus according to claim 1, wherein the second BWP is a default BWP or an initial BWP.

3. The apparatus according to claim 1, wherein the second BWP is a non-default BWP or a non-initial BWP.

4. The apparatus according to claim 3, wherein, responsive to determining that the carrier comprises the second BWP in the active state, the operations further comprises:
skipping activating a default BWP or an initial BWP in the carrier.

5. The apparatus according to claim 1, wherein, responsive to determining that the carrier comprises the second BWP in an inactive state, the operations further comprises:
activating the default BWP or the initial BWP in the carrier.

6. The apparatus according to claim 5, wherein, responsive to determining that there are at least two default BWPs in the carrier, the activating the default BWP in the carrier comprises:
activating the at least two default BWPs; or
activating a BWP that is comprised in the at least two default BWPs and that meets a preset rule.

7. The apparatus according to claim 6, wherein the preset rule comprises that:
a BWP index is the largest;
the BWP index is the smallest;
a subcarrier spacing (SCS) is the largest;
the SCS is the smallest;
a cyclic prefix (CP) is the largest;
the CP is the smallest; or
a numerology is the same as a parameter set of the first BWP.

8. The apparatus according to claim 1,
wherein the determining whether the carrier in which the first BWP is located comprises the second BWP in the active state comprises:
determining whether the second BWP in the active state is comprised in a first BWP group, wherein the first BWP group is a BWP group that is in the at least two BWP groups and that comprises the first BWP.

9. The apparatus according to claim 1, wherein timing durations of inactivity timers corresponding to BWPs in a same BWP group are the same.

10. The apparatus according to claim 1, wherein each BWP group in the at least two BWP groups is preconfigured by using a predefined rule.

11. The apparatus according to claim 10, wherein the predefined rule comprises that BWPs in a same BWP group have a same parameter, and/or a same default BWP is configured for BWPs in a same BWP group.

12. The apparatus according to claim 1, wherein a timing duration of the inactivity timer is a carrier-specific timing duration or a BWP-specific timing duration.

13. The apparatus according to claim 1, wherein a timing duration of the inactivity timer is related to a parameter of a BWP in the carrier.

14. A non-transitory computer readable storage medium, comprising a program which, when executed by a processor, causes the processor to perform operations comprising:
  responsive to expiration of an inactivity timer corresponding to an active first bandwidth part (BWP), determining whether a carrier in which the first BWP is located comprises a second BWP in an active state, wherein the carrier comprises at least two BWP groups, each BWP group comprises at least one BWP, and a quantity of BWPs in the active state in each BWP group simultaneously is 1 or 0; and
  responsive to determining that the carrier comprises the second BWP in the active state, deactivating the first BWP,
  wherein the determining whether the carrier in which the first BWP is located comprises the second BWP in the active state comprises:
  responsive to determining that a first BWP group does not comprise a default BWP, determining whether the second BWP in the active state is comprised in a second BWP group; or
  responsive to determining that the first BWP group does not comprise the default BWP and an initial BWP, determining whether the second BWP in the active state is comprised in the second BWP group,
  wherein the first BWP group is a BWP group that is in the at least two BWP groups and that comprises the first BWP, and the second BWP group is a BWP group that is in the at least two BWP groups and that does not comprise the first BWP.

15. The non-transitory computer readable storage medium according to claim 14, wherein the second BWP is a default BWP or an initial BWP.

16. The non-transitory computer readable storage medium according to claim 14, wherein, responsive to determining that the carrier comprises the second BWP in an inactive state, the operations further comprises:
  activating the default BWP or the initial BWP in the carrier.

17. The non-transitory computer readable storage medium according to claim 14, wherein, responsive to determining that there are at least two default BWPs in the carrier,
  the activating the default BWP in the carrier comprises:
  activating the at least two default BWPs; or
  activating a BWP that is comprised in the at least two default BWPs and that meets a preset rule.

18. The non-transitory computer readable storage medium according to claim 17, wherein the preset rule comprises that:
  a BWP index is the largest;
  the BWP index is the smallest;
  a subcarrier spacing (SCS) is the largest;
  the SCS is the smallest;
  a cyclic prefix (CP) is the largest;
  the CP is the smallest; or
  a numerology is the same as a parameter set of the first BWP.

* * * * *